US008365216B2

(12) United States Patent
Lienhart et al.

(10) Patent No.: US 8,365,216 B2
(45) Date of Patent: *Jan. 29, 2013

(54) VIDEO STREAM MODIFICATION TO DEFEAT DETECTION

(75) Inventors: Rainer W. Lienhart, Friedberg (DE); Charles A. Eldering, Furlong, PA (US); Richard König, London (GB)

(73) Assignee: Technology, Patents & Licensing, Inc., Doylestown, PA (US)

( * ) Notice: Subject to any disclaimer, the term of this patent is extended or adjusted under 35 U.S.C. 154(b) by 378 days.

This patent is subject to a terminal disclaimer.

(21) Appl. No.: 12/660,168

(22) Filed: Feb. 22, 2010

(65) Prior Publication Data

US 2010/0158358 A1 Jun. 24, 2010

Related U.S. Application Data

(63) Continuation of application No. 11/120,095, filed on May 2, 2005, now Pat. No. 7,690,011.

(51) Int. Cl.
 H04N 7/16 (2006.01)
 H04N 7/10 (2006.01)
 H04N 7/025 (2006.01)
(52) U.S. Cl. .......................................... 725/32; 725/25
(58) Field of Classification Search .................. None
 See application file for complete search history.

(56) References Cited

U.S. PATENT DOCUMENTS

| | | | |
|---|---|---|---|
| 3,919,479 A | 11/1975 | Moon et al. | |
| 4,888,638 A | 12/1989 | Bohn | |
| 4,974,085 A | 11/1990 | Campbell | |
| 5,029,014 A | 7/1991 | Lindstrom | |
| 5,155,591 A | 10/1992 | Wachob | |
| 5,319,455 A | 6/1994 | Hoarty et al. | |
| 5,389,964 A | 2/1995 | Oberle | |
| 5,436,653 A | 7/1995 | Ellis | |
| 5,446,919 A | 8/1995 | Wilkins | |
| 5,574,572 A | 11/1996 | Malinowski et al. | |
| 5,600,366 A | 2/1997 | Schulman | |
| 5,661,516 A | 8/1997 | Carles | |
| 5,668,917 A | 9/1997 | Lewine | |
| 5,715,018 A | 2/1998 | Fasciano | |
| 5,748,263 A | 5/1998 | Ball | |
| 5,774,170 A | 6/1998 | Hite | |
| 5,892,536 A | 4/1999 | Logan | |
| 5,973,723 A | 10/1999 | DeLuca | |
| 5,973,750 A | 10/1999 | Ogawa et al. | |

(Continued)

FOREIGN PATENT DOCUMENTS

| | | |
|---|---|---|
| EP | 1313313 | 5/2003 |
| GB | 2361127 | 10/2001 |

(Continued)

OTHER PUBLICATIONS

Unpublished U.S. Appl. No. 09/568,084, filed May 10, 2000. First named inventor: Charles A. Eldering.

(Continued)

*Primary Examiner* — Mark D Featherstone
(74) *Attorney, Agent, or Firm* — Technology, Patents & Licensing, Inc.

(57) ABSTRACT

A method and system for detecting automatic ad detection is presented in which video streams are modified such that features cannot be automatically recognized or statistical parameters and fingerprints derived from the video stream cannot be matched against fingerprints of known video segments in a database.

15 Claims, 34 Drawing Sheets

U.S. PATENT DOCUMENTS

| | | | |
|---|---|---|---|
| 5,978,381 | A | 11/1999 | Perlman et al. |
| 5,986,692 | A | 11/1999 | Logan |
| 5,987,210 | A | 11/1999 | Iggulden et al. |
| 5,999,689 | A | 12/1999 | Iggulden |
| 6,002,443 | A | 12/1999 | Iggulden |
| 6,028,950 | A | 2/2000 | Merjanian |
| 6,058,191 | A * | 5/2000 | Quan ............................ 380/203 |
| 6,078,896 | A | 6/2000 | Kaehler |
| 6,100,941 | A | 8/2000 | Dimitrova |
| 6,122,016 | A | 9/2000 | DeHaan |
| 6,404,977 | B1 | 6/2002 | Iggulden |
| 6,425,127 | B1 | 7/2002 | Bates |
| 6,446,261 | B1 | 9/2002 | Rosser |
| 6,463,585 | B1 | 10/2002 | Hendricks et al. |
| 6,469,749 | B1 | 10/2002 | Dimitrova |
| 6,487,721 | B1 | 11/2002 | Safadi |
| 6,490,370 | B1 | 12/2002 | Krasinski et al. |
| 6,536,037 | B1 | 3/2003 | Guheen et al. |
| 6,560,578 | B2 | 5/2003 | Eldering |
| 6,577,346 | B1 | 6/2003 | Perlman |
| 6,593,976 | B1 | 7/2003 | Lord |
| 6,597,405 | B1 | 7/2003 | Iggulden |
| 6,606,744 | B1 | 8/2003 | Mikurak |
| 6,615,039 | B1 | 9/2003 | Eldering |
| 6,633,651 | B1 | 10/2003 | Hirzalla |
| 6,646,655 | B1 | 11/2003 | Brandt et al. |
| 6,675,174 | B1 | 1/2004 | Bolle et al. |
| 6,698,020 | B1 | 2/2004 | Zigmond et al. |
| 6,704,930 | B1 | 3/2004 | Eldering |
| 6,721,733 | B2 | 4/2004 | Lipson et al. |
| 6,738,978 | B1 | 5/2004 | Hendricks et al. |
| 6,771,316 | B1 | 8/2004 | Iggulden |
| 6,819,863 | B2 | 11/2004 | Dagtas et al. |
| 6,820,277 | B1 | 11/2004 | Eldering |
| 6,892,193 | B2 | 5/2005 | Bolle et al. |
| 6,912,571 | B1 | 6/2005 | Serena |
| 6,983,481 | B2 | 1/2006 | Fellenstein |
| 6,987,883 | B2 | 1/2006 | Lipton et al. |
| 7,020,304 | B2 | 3/2006 | Alattar et al. |
| 7,039,932 | B2 | 5/2006 | Eldering |
| 7,051,351 | B2 | 5/2006 | Goldman |
| 7,055,166 | B1 | 5/2006 | Logan et al. |
| 7,062,084 | B2 | 6/2006 | Messing et al. |
| 7,064,796 | B2 | 6/2006 | Roy et al. |
| 7,068,724 | B1 | 6/2006 | Hamilton |
| 7,089,575 | B2 | 8/2006 | Agnihotri et al. |
| 7,110,454 | B1 | 9/2006 | Chakraborty |
| 7,116,377 | B2 | 10/2006 | Zeidler |
| 7,146,632 | B2 | 12/2006 | Miller |
| 7,168,083 | B2 | 1/2007 | Kalker |
| 7,185,044 | B2 | 2/2007 | Ryan et al. |
| 7,185,353 | B2 | 2/2007 | Schlack |
| 7,228,555 | B2 | 6/2007 | Schlack |
| 7,266,832 | B2 | 9/2007 | Miller |
| 7,269,330 | B1 | 9/2007 | Iggulden |
| 7,272,295 | B1 | 9/2007 | Christopher |
| 7,298,962 | B2 | 11/2007 | Quan |
| 7,327,885 | B2 | 2/2008 | Divakaran et al. |
| 7,328,448 | B2 | 2/2008 | Eldering |
| 7,333,864 | B1 | 2/2008 | Herley |
| 7,461,392 | B2 | 12/2008 | Herley |
| 7,467,398 | B2 | 12/2008 | Fellenstein |
| 7,500,258 | B1 | 3/2009 | Eldering |
| 7,650,617 | B2 | 1/2010 | Hoshino et al. |
| 7,738,704 | B2 | 6/2010 | Lienhart et al. |
| 7,809,154 | B2 | 10/2010 | Lienhart et al. |
| 7,813,954 | B1 | 10/2010 | Price et al. |
| 2001/0032333 | A1 | 10/2001 | Flickinger |
| 2001/0049620 | A1 | 12/2001 | Blasko |
| 2002/0010919 | A1 | 1/2002 | Lu et al. |
| 2002/0067730 | A1 | 6/2002 | Hinderks |
| 2002/0069218 | A1 | 6/2002 | Sull et al. |
| 2002/0072966 | A1 | 6/2002 | Eldering |
| 2002/0075402 | A1 | 6/2002 | Robson |
| 2002/0083439 | A1 | 6/2002 | Eldering |
| 2002/0083441 | A1 | 6/2002 | Flickinger |
| 2002/0083445 | A1 | 6/2002 | Flickinger |
| 2002/0087973 | A1 | 7/2002 | Hamilton |
| 2002/0120925 | A1 | 8/2002 | Logan |
| 2002/0123928 | A1 | 9/2002 | Eldering |
| 2002/0124077 | A1 | 9/2002 | Hill et al. |
| 2002/0126224 | A1 | 9/2002 | Lienhart |
| 2002/0129362 | A1 | 9/2002 | Chang |
| 2002/0144262 | A1 | 10/2002 | Plotnick |
| 2002/0144263 | A1 | 10/2002 | Eldering |
| 2002/0178445 | A1 | 11/2002 | Eldering |
| 2002/0178447 | A1 | 11/2002 | Plotnick |
| 2002/0184047 | A1 | 12/2002 | Plotnick |
| 2002/0186957 | A1 | 12/2002 | Yuen |
| 2002/0194592 | A1 | 12/2002 | Tsuchida |
| 2003/0001977 | A1 | 1/2003 | Wang |
| 2003/0004810 | A1 | 1/2003 | Eldering |
| 2003/0012548 | A1 | 1/2003 | Levy et al. |
| 2003/0023972 | A1 | 1/2003 | Gutta |
| 2003/0048853 | A1 | 3/2003 | Oh et al. |
| 2003/0093790 | A1 | 5/2003 | Logan et al. |
| 2003/0115595 | A1 | 6/2003 | Stevens |
| 2003/0122966 | A1 | 7/2003 | Markman et al. |
| 2003/0123841 | A1 | 7/2003 | Jeannin |
| 2003/0149975 | A1 | 8/2003 | Eldering |
| 2003/0185541 | A1 | 10/2003 | Green |
| 2003/0192045 | A1 | 10/2003 | Fellenstein |
| 2003/0192046 | A1 | 10/2003 | Spehr |
| 2003/0226150 | A1 | 12/2003 | Berberet et al. |
| 2003/0227475 | A1 | 12/2003 | Fellenstein |
| 2004/0001161 | A1 | 1/2004 | Herley |
| 2004/0025176 | A1 | 2/2004 | Franklin et al. |
| 2004/0128317 | A1 | 7/2004 | Sull et al. |
| 2004/0148625 | A1 | 7/2004 | Eldering |
| 2004/0163106 | A1 | 8/2004 | Schrempp et al. |
| 2004/0189873 | A1 | 9/2004 | Konig |
| 2004/0194130 | A1 | 9/2004 | Konig |
| 2004/0226035 | A1 | 11/2004 | Hauser |
| 2004/0237102 | A1 | 11/2004 | Konig |
| 2004/0260682 | A1 | 12/2004 | Herley et al. |
| 2005/0015795 | A1 | 1/2005 | Iggulden |
| 2005/0044561 | A1 | 2/2005 | McDonald |
| 2005/0066352 | A1 | 3/2005 | Herley |
| 2005/0086682 | A1 | 4/2005 | Burges et al. |
| 2005/0120367 | A1* | 6/2005 | Linzer .............................. 725/22 |
| 2005/0149968 | A1 | 7/2005 | Konig |
| 2005/0166224 | A1 | 7/2005 | Ficco |
| 2005/0172312 | A1 | 8/2005 | Lienhart |
| 2005/0177847 | A1 | 8/2005 | Konig |
| 2005/0193410 | A1 | 9/2005 | Eldering |
| 2005/0253966 | A1 | 11/2005 | Mertens |
| 2005/0283796 | A1 | 12/2005 | Flickinger |
| 2006/0015464 | A1* | 1/2006 | Dewolde ......................... 705/57 |
| 2006/0195859 | A1 | 8/2006 | Konig |
| 2006/0195860 | A1 | 8/2006 | Eldering |
| 2006/0195861 | A1* | 8/2006 | Lee .................................. 725/19 |
| 2006/0242667 | A1 | 10/2006 | Petersen |
| 2006/0245625 | A1 | 11/2006 | Tichelaar et al. |
| 2006/0248569 | A1 | 11/2006 | Lienhart |
| 2006/0271947 | A1 | 11/2006 | Lienhart |
| 2007/0130581 | A1 | 6/2007 | DelSesto et al. |
| 2007/0248224 | A1 | 10/2007 | Buskey et al. |

FOREIGN PATENT DOCUMENTS

| | | |
|---|---|---|
| GB | 2361128 | 10/2001 |
| GB | 2365649 | 2/2002 |
| GB | 2399976 | 9/2004 |
| JP | 11185039 | 7/1999 |
| JP | 11213163 | 8/1999 |
| JP | 21024956 | 1/2001 |
| JP | 21111921 | 4/2001 |
| JP | 22329205 | 11/2002 |
| WO | WO98/20675 | 5/1998 |
| WO | WO98/56128 | 12/1998 |
| WO | WO99/66719 | 12/1999 |
| WO | WO00/36775 | 6/2000 |
| WO | WO00/54504 | 9/2000 |
| WO | WO00/64165 | 10/2000 |
| WO | WO00/70869 | 11/2000 |
| WO | WO01/33848 | 5/2001 |
| WO | WO02/03227 | 1/2002 |
| WO | WO02/09328 | 1/2002 |

| WO | WO02/102079 | 12/2002 |
| WO | WO03/010965 | 2/2003 |
| WO | WO03/052551 | 6/2003 |
| WO | WO03/053058 | 6/2003 |
| WO | WO03/105377 | 12/2003 |

OTHER PUBLICATIONS

Unpublished U.S. Appl. No. 09/635,539, filed Aug. 10, 2000. First named inventor: Charles A. Eldering.
Unpublished U.S. Appl. No. 09/635,544, filed Aug. 10, 2000. First named inventor: Gregory C. Flickinger.
Unpublished U.S. Appl. No. 09/658,204, filed Sep. 8, 2000. First named inventor: Charles A. Eldering.
Unpublished U.S. Appl. No. 09/680,622, filed Oct. 6, 2000. First named inventor: Gregory C. Flickinger.
Unpublished U.S. Appl. No. 09/712,790, filed Nov. 14, 2000. First named inventor: Charles A. Eldering.
Unpublished U.S. Appl. No. 10/031,268, filed Mar. 23, 2002. First named inventor: Charles A. Eldering.
Unpublished U.S. Appl. No. 10/049,246, filed Jan. 28, 2002. First named inventor: Jeffrey S. Hamilton.
Rainer Lienhart et al, On the Detection and Recognition of Television Commercials, University of Mannheim, Praktische Informatik vol. IV, Apr. 1997, 509-516, Mannheim, Germany.
Product Literature, "A Feature-Based Algorithm for Detecting and Classifying Production Effects" printed from http://www.c.s.cornell.edu/rdz/Papers/Archive/90070119 on Mar. 26, 2004.
Product Literature, Mork, Peter et al, "Indexing Tamper Resistant Features for Image Copy Detection," printed from the hhtp://www-db.stanford.edu/chenli/rime/demo1.0.html on Mar. 26, 2004; 1999; 5 pp.
IEEE Paper "Localizing and Segmenting Text in Images and Videos" by Lien Hart, R. and Wernicke, A., Apr. 2002, 13 pp.
Minerva M. Yeung & Bede Liu, Efficient Matching and Clustering of Video Shots, Sep. 1995, 338-341, Princeton Univeristy, Princeton, NJ.
GM Landaunishkin, "Pattern matching in a digitized image".
Greg Pass/Ramin Zabih/Justin Miller;, "Comparing Images Using Color Coherence Vectors".
Fullá, et al; Detección de anuncios en secuencias de televisión; Universidad Politécnia de Valencia, Dept de Comunicaciones, Oct. 13, 2003, 100 pgs.
Fullá and Albiol, Detection of TV Commercials; Technical University of Valencia, pp. 541-544.
Drucker; et al; "Smartskip: Consumer Level Browsing and Skipping of Digital Video Content"; Technology to Help people find information; Minn, MN; Apr. 20-25, 2002; vol. 4, Issue 1; pp. 219-226.
Dimitrova, et al; On Selective Video Content Analysis & Filtering; IS&T/SPIE Conf. on Storage and. Retrieval of Media Databases; Jan. 2000; SPIE vol. 3972; 10 pgs.
Dimitrova, et al; "Applications of Video Content Analysis and Retrieval"; IEEE Multimedia, Jul.-Sep. 2002; pp. 42-54.
Gauch J.M. et al; "Identification of New Commercials Using Repeated Video Sequence Detection", Proceedings of IEEE International Conf. on Image Processing, ICIP '2005 Sep. 11, 2005, pp. 1252-1255.
Pua K.M. et al; "Real time repeated video sequence identification", Computer Vision and Image Understanding Academic Press, San Diego, CA, vol. 93, No. 3, Mar. 2004, pp. 310-327.
Naturel, X et al; "A fast shot matching strategy for detecting duplicate sequences in a television stream", Proceedings of the 2nd International Workshop on Computer Vision Meets Databases, Baltimore, MD, International Conference Proceedings Series, Jun. 17, 2005, pp. 21-27. ACM Press, NY.
NextStream, "A Solution for Ad Insertion within a Digital Television Network"; Sep. 2003.
D.C. Hutchison et al., "Application of Second Generation Advanced Multi-media Display Processor (AMDP2) in a Digital Micro-Mirror Array Based HDTV", IEEE, 2001.
E. McGrath, "Digital Insertion of Advertising into a Digital Stream (DID)", International Broadcasting Convention, IEEE 1997.

* cited by examiner

300

| 10 | 00 | 00 | 00 | 10 | 00 | 00 | 00 | 10 | 00 | 00 | 00 |
| $R_2$ | $G_0$ | $B_0$ | $R_0$ | $G_2$ | $B_0$ | $R_0$ | $G_0$ | $B_2$ | $R_0$ | $G_0$ | $B_0$ |
| 10 | 00 | 01 | 00 | 10 | 01 | 00 | 00 | 11 | 00 | 00 | 01 |
| $R_2$ | $G_0$ | $B_1$ | $R_0$ | $G_2$ | $B_1$ | $R_0$ | $G_0$ | $B_3$ | $R_0$ | $G_0$ | $B_1$ |
| 10 | 01 | 00 | 00 | 11 | 00 | 00 | 01 | 10 | 00 | 01 | 00 |
| $R_2$ | $G_1$ | $B_0$ | $R_0$ | $G_3$ | $B_0$ | $R_0$ | $G_1$ | $B_2$ | $R_0$ | $G_1$ | $B_0$ |
| 11 | 00 | 00 | 01 | 10 | 00 | 01 | 00 | 10 | 01 | 00 | 00 |
| $R_3$ | $G_0$ | $B_0$ | $R_1$ | $G_2$ | $B_0$ | $R_1$ | $G_0$ | $B_2$ | $R_1$ | $G_0$ | $B_0$ |

| $R_0$ | $R_1$ | $R_2$ | $R_3$ | $G_0$ | $G_1$ | $G_2$ | $G_3$ | $B_0$ | $B_1$ | $B_2$ | $B_3$ |
| 9 | 3 | 3 | 1 | 9 | 3 | 3 | 1 | 9 | 3 | 3 | 1 |

| LABEL (COLOR) | FEATURE VECTOR (COUNT) |
|---|---|
| 0 | 4 |
| 1 | 2 |
| 2 | 2 |
| 3 | 1 |

400

| LABEL (COLOR) | FEATURE VECTOR (COUNT) |
|---|---|
| 0 | 2 |
| 1 | 3 |
| 2 | 1 |
| 3 | 3 |

410

$420 \quad (|4-2| + |2-3| + |2-1| + |1-3|) = 6$ $430 \quad ((4-2)^2 + (2-3)^2 + (2-1)^2 + (1-3)^2) = 10$

FIG. 4

| LABEL (COLOR) | FEATURE VECTOR (COUNT) |
|---|---|
| 0 | 2 |
| 1 | 3 |
| 2 | 1 |
| 3 | 3 |

600

| LABEL (COLOR) | FEATURE VECTOR (COUNT) |
|---|---|
| 0 - C | 2 |
| 0 - I | 0 |
| 1 - C | 3 |
| 1 - I | 0 |
| 2 - C | 0 |
| 2 - I | 1 |
| 3 - C | 2 |
| 3 - I | 1 |

620

| LABEL (COLOR) | FEATURE VECTOR (COUNT) |
|---|---|
| 0 | 2 |
| 1 | 3 |
| 2 | 1 |
| 3 | 3 |

610

| LABEL (COLOR) | FEATURE VECTOR (COUNT) |
|---|---|
| 0 - C | 0 |
| 0 - I | 2 |
| 1 - C | 2 |
| 1 - I | 1 |
| 2 - C | 0 |
| 2 - I | 1 |
| 3 - C | 3 |
| 3 - I | 0 |

630

$?CH = |2-2| + |3-3| + |1-1| + |3-3| = 0$ $?CCV = (|2-0| + |0-2|) + (|3-2| + |0-1|) + (|0-0| + |1-1|) + (|2-3| + |1-0|)$
$= 8$

FIG. 6

| LABEL (REGION) | FEATURE VECTOR (AVG. COLOR) |
|---|---|
| 710 | 1.5 |
| 720 | 2.5 |
| 730 | 1.0 |
| 740 | 1.5 |
| 750 | 2.0 |
| 760 | 1.5 |
| 770 | 1.75 |
| 780 | 1.25 |
| 785 | 1.5 |
| 790 | 0.5 |
| 795 | 2.5 |

| LABEL (COLOR) | FEATURE VECTOR (COUNT) |
|---|---|
| 0 | 61 |
| 1 | 60 |

~ 900

$CCV_{800}$ =

| LABEL (COLOR) | FEATURE VECTOR (COUNT) |
|---|---|
| 0-C | 47 |
| 0-I | 14 |
| 1-C | 50 |
| 1-I | 10 |

~ 930

| LABEL (REGION) | FEATURE VECTOR (AVG. COLOR) |
|---|---|
| 815 | 0 |
| 820 | 0 |
| 825 | .5 |
| 830 | .5 |
| 835 | .5 |
| 840 | .5 |
| 845 | .5 |
| 850 | .5 |

~ 960

$CH_{810}$ =

| LABEL (COLOR) | FEATURE VECTOR (COUNT) |
|---|---|
| 0 | 61 |
| 1 | 60 |

~ 910

?CH = 0 ~ 920

$CCV_{810}$ =

| LABEL (COLOR) | FEATURE VECTOR (COUNT) |
|---|---|
| 0-C | 47 |
| 0-I | 14 |
| 1-C | 50 |
| 1-I | 10 |

~ 940

?CCV = 0 ~ 950

| LABEL (REGION) | FEATURE VECTOR (AVG. COLOR) |
|---|---|
| 855 | .5 |
| 860 | .5 |
| 865 | 0 |
| 870 | 1 |
| 875 | 1 |
| 880 | 0 |
| 885 | .75 |
| 890 | .25 |

INCOMING VIDEO STREAM
(Feature Vectors – Counts/color)

| COLORS | FRAME 1 | FRAME 2 | FRAME 3 |
|---|---|---|---|
| 0 - C | 5 | 7 | 8 |
| 0 - I | 10 | 8 | 7 |
| 1 - C | 5 | 6 | 6 |
| 1 - I | 5 | 4 | 4 |

STORED FINGERPRINTS
(Feature Vectors – Counts/color)

$FP_1$

| FRAME 1 | FRAME 2 | FRAME 3 |
|---|---|---|
| 12 | 10 | 10 |
| 0 | 2 | 4 |
| 10 | 11 | 10 |
| 3 | 2 | 1 |

?CCV = ?F1 + ?F2 + ?F3
= ( |5-12| + |10-0| + |5-10| + |5-3| ) + ( |7-10| + |8-2| + |6-11| + |4-2| ) +
  ( |8-10| + |7-4| + |6-10| + |4-1| )
= 24 + 16 + 12 = 52

⋮

$FP_n$

| | | |
|---|---|---|
| 6 | 7 | 7 |
| 9 | 8 | 8 |
| 6 | 6 | 5 |
| 4 | 4 | 5 |

?CCV = ?F1 + ?F2 + ?F3
= ( |5-6| + |10-9| + |5-6| + |5-4| ) + ( |7-7| + |8-8| + |6-6| + |4-4| )
+
  ( |8-7| + |7-8| + |6-5| + |4-5| )
= 4 + 0 + 4 = 8

FIG. 12

INCOMING VIDEO STREAM
(Feature Vectors – Counts/color)

| F₁ | F₂ | F₃ |
|----|----|----|
| 5  | 5  | 5  |
| 10 | 10 | 10 |
| 5  | 6  | 7  |
| 5  | 4  | 3  |

STORED FINGERPRINT
(Feature Vectors – Counts/color)

| F₁ | F₂ | F₃ | F₄ | F₅ |
|----|----|----|----|----|
| 10 | 10 | 5  | 5  | 5  |
| 0  | 2  | 10 | 10 | 10 |
| 10 | 10 | 4  | 5  | 6  |
| 5  | 3  | 6  | 5  | 4  |

$$\Sigma CCV(F1\text{-}3 \text{ to } F1\text{-}3) = (|5-10|+|10-0|+|5-10|+|5-10|+|10-2|+|6-10|+|4-3|)+$$
$$(|5-5|+|10-10|+|7-4|+|3-6|)$$
$$= 20+18+6 = 44$$

$$\Sigma CCV(F1\text{-}3 \text{ to } F2\text{-}4) = (|5-10|+|10-2|+|5-10|+|5-3|+|10-10|+|6-4|+|4-6|)+$$
$$(|5-5|+|10-10|+|7-5|+|3-5|)$$
$$= 20+4+4 = 28$$

$$\Sigma CCV(F1\text{-}3 \text{ to } F3\text{-}5) = (|5-5|+|10-10|+|5-4|+|5-6|+|10-10|+|6-5|+|4-5|)+$$
$$(|5-5|+|10-10|+|7-6|+|3-4|)$$
$$= 2+2+2 = 6$$

FIG. 13

VIDEO STREAM MODIFICATION TO DEFEAT DETECTION

CROSS-REFERENCE TO RELATED APPLICATIONS

This application is a continuation of U.S. patent application Ser. No. 11/120,095, filed May 2, 2005 now U.S. Pat. No. 7,690,011, and entitled Video Stream Modification to Defeat Detection, the entire disclosure of which is incorporated herein by reference

BACKGROUND

Video streams can be transmitted over a wide variety of media ranging from over-the-air broadcasts, broadcasts over cable and satellite networks, and streaming of content over the internet. Video streams frequently contain segments that viewers wish to delete or avoid seeing. As an example, viewers may wish to automatically delete or avoid watching advertisements in programming including entertainment, news and sport events. Although viewers would like not to be subject to advertisements and other promotions or sponsored portions of video that are separate from the entertainment content, content providers need to be able to ensure that viewers are subject to the advertisements, or advertisers will not wish to sponsor the programming With advances in video technology comes the ability to automatically detect video segments or video entities including advertisements, program breaks, and scenes. In order to prevent consumers from automatically detecting and deleting advertisements or other video entities that content providers need to preserve, it is desirable to have a system which is able to defeat detection of video entities such as advertisements or other video segments so that automated equipment cannot automatically recognize and delete those video entities

SUMMARY

The present method, system and apparatus provides for the ability to prevent the detection of video segments through the receiving of a video stream and the altering of either features or statistical parameters associated with the video stream such that the altering reduces or eliminates the ability to detect the video segments in the video stream.

The system, method and apparatus allows for the altering of the video streams to prevent the detection of video segments in a manner such that the dissimilarity between a video segment fingerprint derived from the video stream and a stored fingerprint representing a known video segment is increased to the point which it is no longer possible to match the video segment fingerprint to a known video segment fingerprint in the library. The alterations to the video stream can be performed in a manner which does not perceivably degrade the video stream quality thus allowing the user to enjoy the full quality of the video yet disabling automatic detection of video segments.

The modified video stream can be measured to determine if the modifications have been sufficient to substantially increase the dissimilarity between the video segment fingerprint that has been derived from the video stream and any of the stored fingerprints representing the video segment.

In an alternative embodiment, the video stream is modified such that it increases the dissimilarity between the video segment fingerprint derived from the video stream and the expected stored fingerprint but that false matches are allowed. By increasing the number of false matches the video segment detection is effectively rendered useless.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Further features and advantages of the present invention, as well as the structure and operation of various embodiments of the present invention, will become apparent and more readily appreciated from the following description of the preferred embodiments, taken in conjunction with the accompanying drawings of which:

FIG. 3 illustrates an exemplary pixel grid for a video frame and an associated color histogram, according to one embodiment;

FIG. 4 illustrates an exemplary comparison of two color histograms, according to one embodiment;

FIG. 6 illustrates an exemplary comparison of color histograms and CCVs for two images, according to one embodiment;

FIG. 7 illustrates an exemplary pixel grid for a video frame with a plurality of regions sampled, according to one embodiment;

FIG. 9 illustrates exemplary comparisons of the pixel grids of FIG. 8 based on color histograms for the entire frame, CCVs for the entire frame and average color for the plurality of regions, according to one embodiment;

FIG. 12 illustrates an exemplary initial comparison of calculated features for an incoming stream versus initial portions of fingerprints for a plurality of known advertisements, according to one embodiment;

FIG. 13 illustrates an exemplary initial comparison of calculated features for an incoming stream versus an expanded initial portion of a fingerprint for a known advertisement, according to one embodiment;

DESCRIPTION

Figure 1:
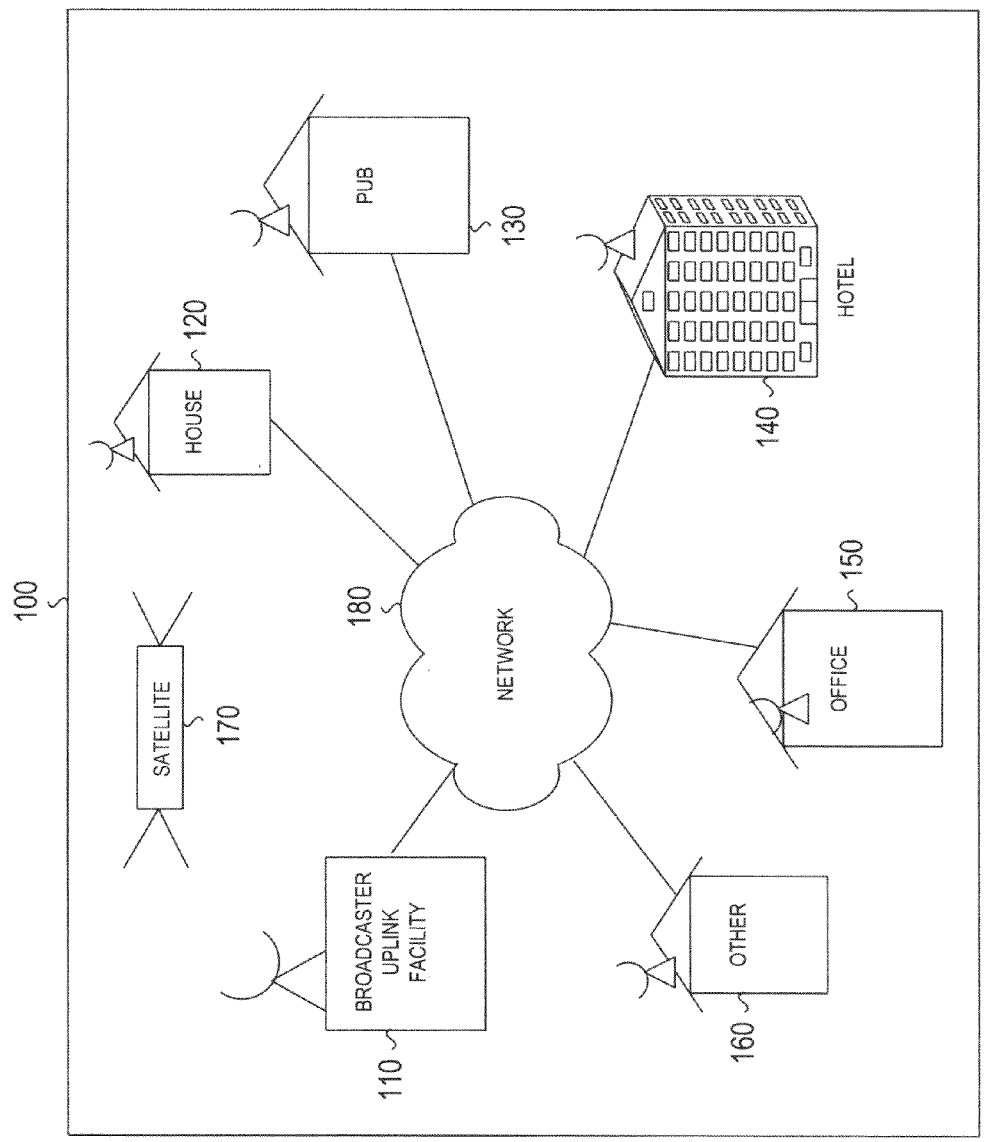
FIG. 1 illustrates an exemplary content delivery system, according to one embodiment.

In describing various embodiments illustrated in the drawings, specific terminology will be used for the sake of clarity. However, the embodiments are not intended to be limited to the specific terms so selected, and it is to be understood that each specific term includes all technical equivalents which operate in a similar manner to accomplish a similar purpose.

FIG. 1 illustrates an exemplary content delivery system 100. The system 100 includes a broadcast facility 110 and receiving/presentation locations. The broadcast facility 110 transmits content to the receiving/presentation facilities and the receiving/presentation facilities receive the content and present the content to subscribers. The broadcast facility 110 may be a satellite transmission facility, a head-end, a central office or other distribution center. The broadcast facility 110 may transmit the content to the receiving/presentation locations via satellite 170 or via a network 180. The network 180 may be the Internet, a cable television network (e.g., hybrid fiber cable, coaxial), a switched digital video network (e.g., digital subscriber line, or fiber optic network), broadcast television network, other wired or wireless network, public network, private network, or some combination thereof. The receiving/presentation facilities may include residence 120, pubs, bars and/or restaurants 130, hotels and/or motels 140, business 150, and/or other establishments 160.

In addition, the content delivery system 100 may also include a Digital Video Recorder (DVR) that allows the user (residential or commercial establishment) to record and playback the programming. The methods and system described herein can be applied to DVRs both with respect to content being recorded as well as content being played back.

The content delivery network 100 may deliver many different types of content. However, for ease of understanding the remainder of this disclosure will concentrate on programming and specifically video programming. Many programming channels include advertisements with the programming. The advertisements may be provided before and/or after the programming, may be provided in breaks during the programming, or may be provided within the programming (e.g., product placements, bugs, banner ads). For ease of understanding the remainder of the disclosure will focus on advertisements opportunities that are provided between programming, whether it be between programs (e.g., after one program and before another) or during programming (e.g., advertisement breaks in programming, during time outs in sporting events). The advertisements may subsidize the cost or the programming and may provide additional sources of revenue for the broadcaster (e.g., satellite service provider, cable service provider).

In addition to being able to recognize advertisements it is also possible to detect particular scenes of interest or to generically detect scene changes. A segment of video or a particular image, or scene change between images, which is of interest, can be considered to be a video entity. The library of video segments, images, scene changes between images, or fingerprints of those images can be considered to be comprised of known video entities.

This specification discusses a variety of mechanisms for detection of video entities and subsequently discusses mechanisms for defeating the automated detection of video entities such as intros, outros, and advertisements.

As the advertisements provided in the programming may not be appropriate to the audience watching the programming at the particular location, substituting advertisements may be beneficial and/or desired. Substitution of advertisements can be performed locally (e.g., residence 120, pub 130, hotel 140) or may be performed somewhere in the video distribution system 100 (e.g., head end, nodes) and then delivered to a specific location (e.g., pub 130), a specific geographic region (e.g., neighborhood), subscribers having specific traits (e.g., demographics) or some combination thereof. For ease of understanding, the remaining disclosure will focus on local substitution as the substitution and delivery of targeted advertisements from within the system 100.

Substituting advertisements requires that advertisements be detected within the programming. The advertisements may be detected using information that is embedded in the program stream to define where the advertisements are. For analog programming cue tones may be embedded in the programming to mark the advertisement boundaries. For digital programming digital cue messages may be embedded in the programming to identify the advertisement boundaries. Once the cue tones or cue tone messages are detected, a targeted advertisement or targeted advertisements may be substituted in place of a default advertisement, default advertisements, or an entire advertisement block. The local detection of cue tones (or cue tone messages) and substitution of targeted advertisements may be performed by local system equipment including a set top box (STB) or DVR. However, not all programming streams include cue tones or cue tone messages. Moreover, cue tones may not be transmitted to the STB or DVR since the broadcaster may desire to suppress them to prevent automated ad detection (and potential deletion).

Techniques for detecting advertisements without the use of cue tones or cue messages include manual detection (e.g., individuals detecting the start of advertisements) and automatic detection. Regardless of what technique is used, the detection can be performed at various locations (e.g., pubs 130, hotels 140). Alternatively, the detection can be performed external to the locations where the external detection points may be part of the system (e.g., node, head end) or may be external to the system. The external detection points would inform the locations (e.g., pubs 130, hotels 140) of the detection of an advertisement or advertisement block. The communications from the external detection point to the locations could be via the network 170. For ease of understanding this disclosure, we will focus on local detection.

Figure 2:
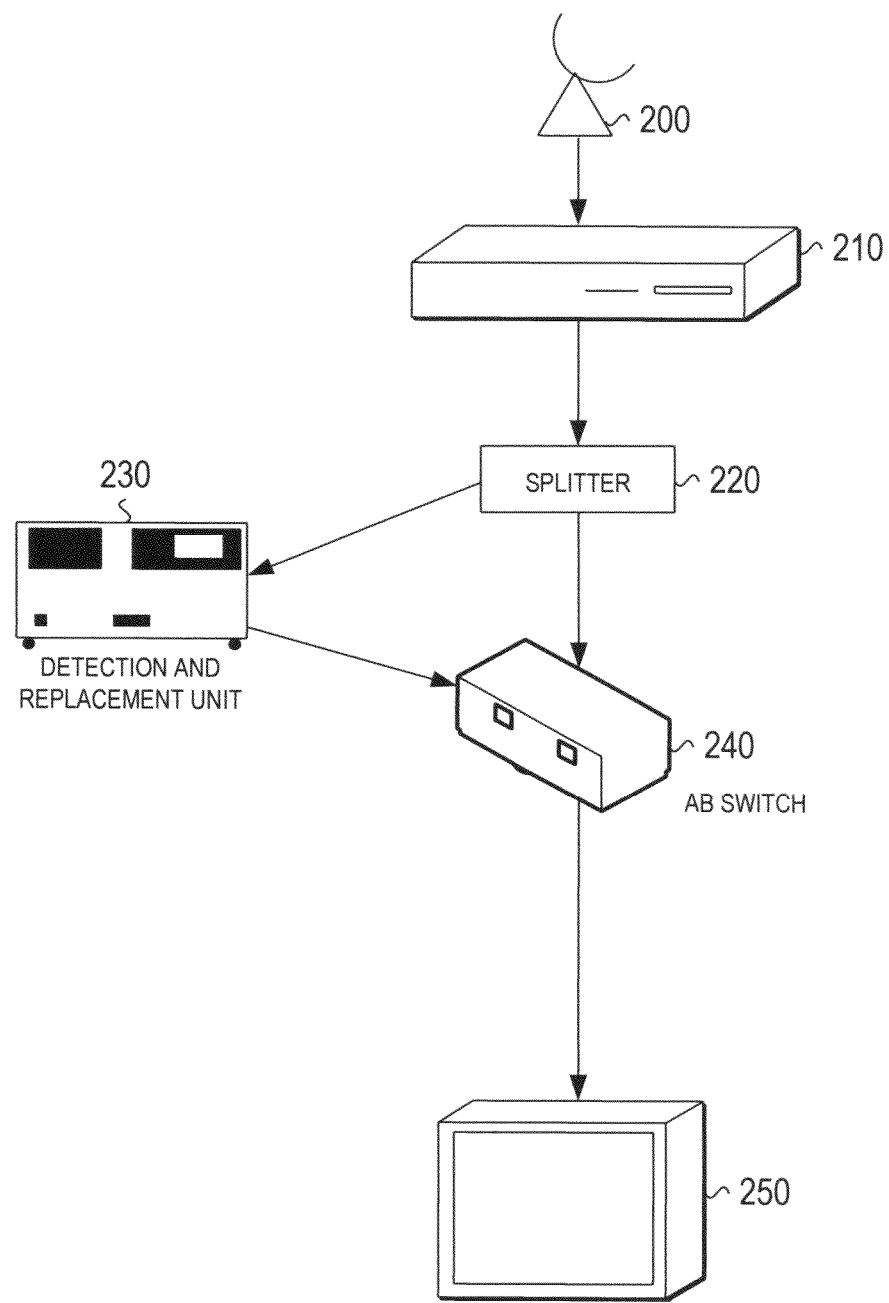
FIG. 2 illustrates an exemplary configuration for local detection of advertisements within a video programming stream, according to one embodiment.

FIG. 2 illustrates an exemplary configuration for manual local detection of advertisements within a video programming stream. The incoming video stream is received by a network interface device (NID) 200. The type of network interface device will be dependent on how the incoming video stream is being delivered to the location. For example, if the content is being delivered via satellite (e.g., 170 of FIG. 1) the NID 200 will be a satellite dish (illustrated as such) for receiving the incoming video stream. The incoming video stream is provided to a STB 210 (a tuner) that tunes to a desired channel, and possibly decodes the channel if encrypted or compressed. It should be noted that the STB 210 may also be capable of recording programming as is the case with a DVR or video cassette recorder VCR.

The STB 210 forwards the desired channel (video stream) to a splitter 220 that provides the video stream to a detection/replacement device 230 and a selector (e.g., A/B switch) 240. The detection/replacement device 230 detects and replaces advertisements by creating a presentation stream consisting of programming with targeted advertisements. The selector 240 can select which signal (video steam or presentation stream) to output to an output device 250 (e.g., television). The selector 240 may be controlled manually by an operator, may be controlled by a signal/message (e.g., ad break beginning message, ad break ending message) that was generated and transmitted from an upstream detection location, and/or may be controlled by the detection/replacement device 230. The splitter 220 and the selector 240 may be used as a bypass circuit in case of an operations issue or problem in the detection/replacement device 230. The default mode for the selector 240 may be to pass-through the incoming video stream.

Manually switching the selector 240 to the detection/replacement device 230 may cause the detection/replacement device 230 to provide advertisements (e.g., targeted advertisements) to be displayed to the subscriber (viewer, user). That is, the detection/replacement device 230 may not detect and insert the advertisements in the program stream to create a presentation stream. Accordingly, the manual switching of the selector 240 may be the equivalent to switching a channel from a program content channel to an advertisement channel. Accordingly, this system would have no copyright issues associated therewith as no recording, analyzing, or manipulation of the program stream would be required.

While the splitter 220, the detection/replacement device 230, and the selector 240 are all illustrated as separate components they are not limited thereby. Rather, all the components could be part of a single component (e.g., the splitter 220 and the selector 240 contained inside the detection/replacement device 230; the splitter 220, the detection/replacement device 230, and the selector 240 could be part of the STB 210).

Automatic techniques for detecting advertisements (or advertisement blocks) may include detecting aspects (features) of the video stream that indicate an advertisement is about to be displayed or is being displayed (feature based detection). For example, advertisements are often played at a higher volume then programming so a sudden volume increase (without commands from a user) may indicate an advertisement. Many times several dark monochrome (black) frames of video are presented prior to the start of an advertisement so the detection of these types of frames may indicate an advertisement. The above noted techniques may be used individually or in combination with one another. These techniques may be utilized along with temporal measurements, since commercial breaks often begin within a certain known time range. However, these techniques may miss advertisements if the volume increases or if the display of black frames is missing or does not meet a detection threshold. Moreover, these techniques may result in false positives (detection of an advertisement when one is not present) as the programming may include volume increases or sequences of black frames.

Frequent scene/shot breaks are more common during an advertisement since action/scene changes stimulate interest in the advertisement. Additionally, there is typically more action and scene changes during an advertisement block. Accordingly, another possible automatic feature based technique for detecting advertisements is the detection of scene/shot breaks (or frequent scene/shot breaks) in the video programming. Scene breaks may be detected by comparing consecutive frames of video. Comparing the actual images of consecutive frames may require significant processing. Alternatively, scene/shot breaks may be detected by computing characteristics for consecutive frames of video and for comparing these characteristics. The computed characteristics may include, for example, a color histogram or a color coherence vector (CCV). The detection of scene/shot breaks may result in many false positives (detection of scene changes in programming as opposed to actual advertisements).

A color histogram is an analysis of the number of pixels of various colors within an image or frame. Prior to calculating a color histogram the frame may be scaled to a particular size (e.g., a fixed number of pixels), the colors may be reduced to the most significant bits for each color of the red, blue, green (RGB) spectrum, and the image may be smoothed by filtering. As an example, if the RGB spectrum is reduced to the 2 most significant bits for each color (4 versions of each color) there will be a total of 6 bits for the RGB color spectrum or 64 total color combinations ($2^6$).

FIG. 3 illustrates an exemplary pixel grid 300 for a video frame and an associated color histogram 310. As illustrated the pixel grid 300 is 4×4 (16 pixels) and each grid is identified by a six digit number with each two digit portion representing a specific color (RGB). Below the digit is the color identifier for each color. For example, an upper right grid has a 000000 as the six digit number which equates to $R_0$, $G_0$ and $B_0$. As discussed, the color histogram 310 is the number of each color in the overall pixel grid. For example, there are 9 $R_0$'s in FIG. 3.

FIG. 4 illustrates an exemplary comparison of two color histograms 400, 410. The comparison entails computing the difference/distance between the two. The distance may be computed for example by summing the absolute differences (L1-Norm) 420 or by summing the square of the differences (L2-Norm) 430. For simplicity and ease of understanding we assume that the image contains only 9 pixels and that each pixel has the same bit identifier for each of the colors in the RGB spectrum so that a single number represents all colors. The difference between the color histograms 400, 410 is 6 using the absolute difference method 420 and 10 using the squared difference method 430. Depending on the method utilized to compare the color histograms the threshold used to detect scene changes or other parameters may be adjusted accordingly.

A color histogram tracks the total number of colors in a frame. Thus, it is possible that when comparing two frames that are completely different but utilize similar colors throughout, a false match will occur. CCVs divide the colors from the color histogram into coherent and incoherent ones based on how the colors are grouped together. Coherent colors are colors that are grouped together in more than a threshold number of connected pixels and incoherent colors are colors that are either not grouped together or are grouped together in less than a threshold number of pixels. For example, if 8 is the threshold and there are only 7 red pixels grouped (connected together) then these 7 red pixels are considered incoherent.

Figure 5:
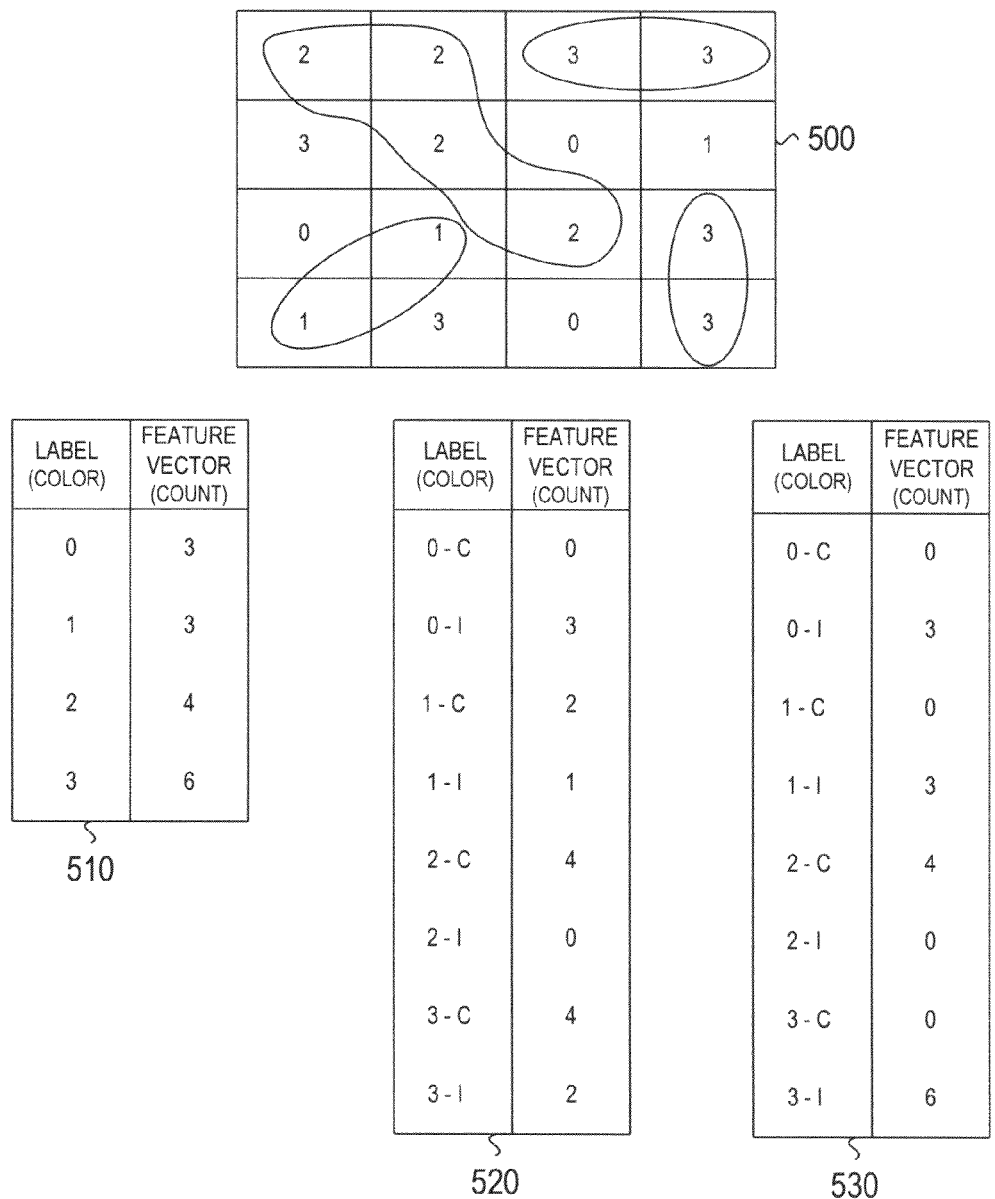
FIG. 5 illustrates an exemplary pixel grid for a video frame and associated color histogram and CCVs, according to one embodiment.

FIG. 5 illustrates an exemplary pixel grid 500 for a video frame and associated color histogram 510 and CCVs 520, 530. For ease of understanding we assume that all of the colors in the pixel grid have the same number associated with each of the colors (RGB) so that a single number represents all colors and the pixel grid 500 is limited to 16 pixels. Within the grid 500 there are some colors that are grouped together (has at least one other color at a connected pixel—one of the 8 touching pixels) and some colors that are by themselves. For example, two color 1s, four color 2s, and four (two sets of 2) color 3s are grouped (connected), while three color 0s, one color 1, and two color 3s are not grouped (connected). The color histogram 510 indicates the number of each color. A first CCV 520 illustrates the number of coherent and incoherent colors assuming that the threshold grouping for being considered coherent is 2 (that is a grouping of two pixels of the same color means the pixels are coherent for that color). A second CCV 530 illustrates the number of coherent and incoherent colors assuming that the threshold grouping was 3. The colors impacted by the change in threshold are color 0 (went from 2 coherent and 1 incoherent to 0 coherent and 3 incoherent) and color 3 (went from 4 coherent and 2 incoherent to 0 coherent and 6 incoherent). Depending on the method utilized to compare the CCVs the threshold used for detecting scene changes or other parameters may be adjusted accordingly.

Figure 6A:
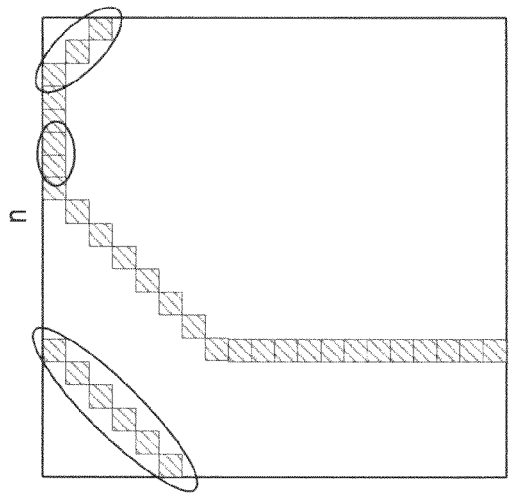
FIG. 6A illustrates edge pixels for two exemplary consecutive images, according to one embodiment.
Figure 6A:
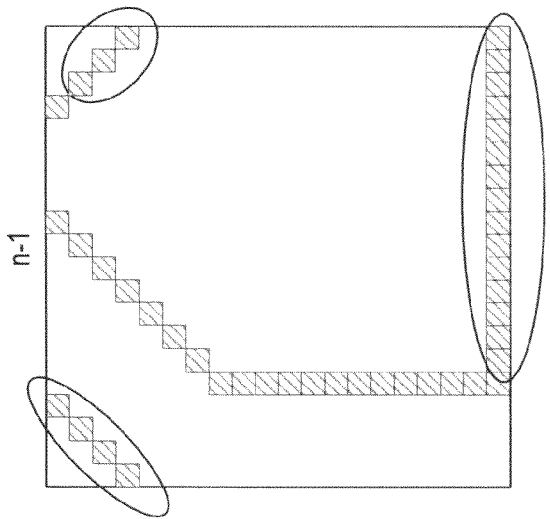

FIG. 6 illustrates an exemplary comparison of color histograms 600, 610 and CCVs 620, 630 for two images. In order to compare, the differences (distances) between the color histograms and the CCVs can be calculated. The differences may be calculated, for example, by summing the absolute differences (L1-Norm) or by summing the square of the differences (L2-Norm). For simplicity and ease of understanding assume that the image contains only 9 pixels and that each pixel has the same bit identifier for each of the colors in the RGB spectrum. As illustrated the color histograms 600, 610 are identical so the difference ($\Delta CH$) is 0 (calculation illustrated for summing the absolute differences). The difference ($\Delta CCV$) between the two CCVs 620, 630 is 8 (based on the sum of the absolute differences method).

Another possible feature based automatic advertisement detection technique includes detecting action (e.g., fast moving objects, hard cuts, zooms, changing colors) as an advertisement may have more action in a short time than the programming. According to one embodiment, action can be determined using edge change ratios (ECR). ECR detects structural changes in a scene, such as entering, exiting and moving objects. The changes are detected by comparing the edge pixels of consecutive images (frames), n and n−1. Edge pixels are the pixels that form the exterior of distinct objects within a scene (e.g., a person, a house). A determination is made as to the total number of edge pixels for two consecutive images, $\sigma_n$ and $\sigma_{n-1}$, the number of edge pixels exiting a first frame, $X_{n-1}^{out}$ and the number of edge pixels entering a second image, $X_n^{in}$. The ECR is the maximum of (1) the ratio of the ratio of outgoing edge pixels to total pixels for a first image $$\left(\frac{X_{n-1}^{out}}{\sigma_{n-1}}\right),$$

or (2) the ratio of incoming edge pixels to total pixels for a second image $$\left(\frac{X_n^{in}}{\sigma_n}\right).$$

FIG. 6A illustrates two exemplary consecutive images, n and n−1. Edge pixels for each of the images are shaded. The total number of edge pixels for image n−1, $\sigma_{n-1}$, is 43 while the total number of edge pixels for image n, $\sigma_n$, is 33. The pixels circled in image n−1 are not part of the image n (they exited image n−1). Accordingly, the number of edge pixels exiting image n−1, $X_{n-1}^{out}$, is 22. The pixels circled in image n were not part of image n−1 the entered image n). Accordingly, the number of edge pixels entering image n, $X_n^{in}$, is 12. The ECR is the greater of the two ratios $$\frac{X_{n-1}^{out}}{\sigma_{n-1}}(22/43) \text{ and } \frac{X_n^{in}}{\sigma_n}(12/33).$$

Accordingly, the ECR value is 0.512.

Figure 6B:
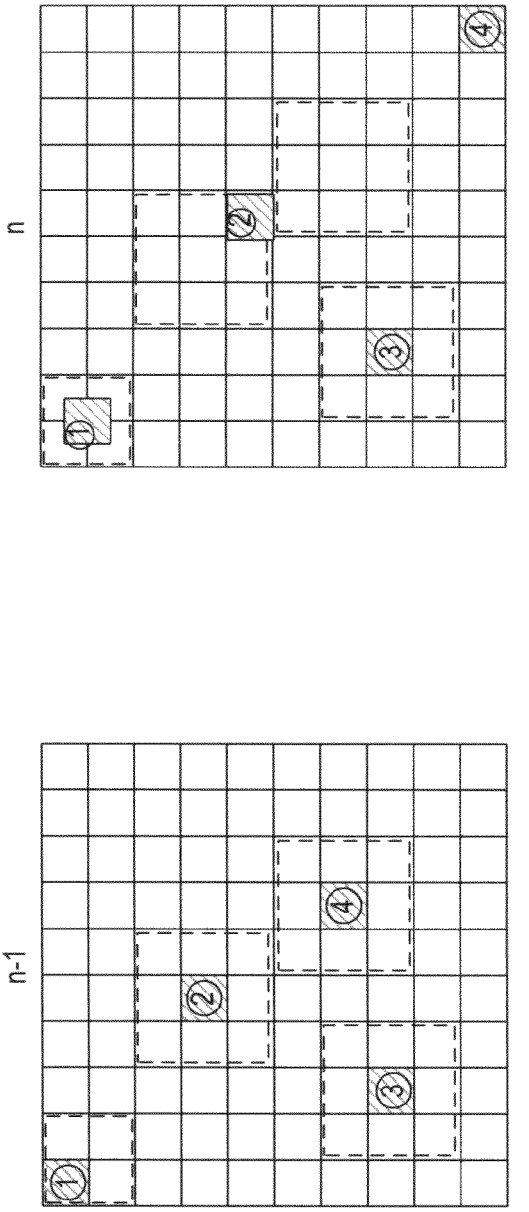
FIG. 6B illustrates macroblocks for two exemplary consecutive images, according to one embodiment.

Action can be determined using a motion vector length (MVL). The MVL divides images (frames) into macroblocks (e.g., 16×16 pixels). A determination is then made as to where each macroblock is in the next image (e.g., distance between macroblock in consecutive images). The determination may be limited to a certain number of pixels (e.g., 20) in each direction. If the location of the macroblock can not be determined then a predefined maximum distance may be defined (e.g., 20 pixels in each direction). The macroblock length vector for each macroblock can be calculated as the square root of the sum of the squares of the differences between the x and y coordinates $[\sqrt{(x_1-x_2)^2+(y_1-y_2)^2}]$ FIG. 6B illustrates two exemplary consecutive images, n and n−1. The images are divided into a plurality of macroblocks (as illustrated each macroblock is 4 (2×2) pixels). Four specific macroblocks are identified with shading and are labeled 1-4 in the first image n−1. A maximum search area is defined around the 4 specific macroblocks as a dotted line (as illustrated the search areas is one macroblock in each direction). The four macroblocks are identified with shading on the second image n. Comparing the specified macroblocks between images reveals that the first and second macroblocks moved within the defined search are, the third macroblock did not move, and the fourth macroblock moved out of the search area. If the upper left hand pixel is used as the coordinates for the macroblock it can be seen that MB1 moved from 1,1 to 2,2; MB2 moved from 9,7 to 11,9; MB3 did not move from 5,15; and MB4 moved from 13,13 to outside of the range. Since MB4 could not be found within the search window a maximum distance of 3 pixels in each direction is defined.

Accordingly, the length vector for the macroblocks is 1.41 for MB1, 2.83 for MB2, 0 for MB3, and 4.24 for MB4.

As with the other feature based automatic advertisement detection techniques the action detection techniques (e.g., ECR, MVL) do not always provide a high level of confidence that the advertisement is detected and may also led to false positives.

Several of these techniques may be used in conjunction with one another to produce a result with a higher degree of confidence and may be able to reduce the number of false positives and detect the advertisements faster. However, as the feature based techniques are based solely on recognition of features that may be present more often in advertisements than programming there can probably never be a complete level of confidence that an advertisement has been detected. In addition, it may take a long time to recognize that these features are present (several advertisements).

In some countries, commercial break intros are utilized to indicate to the viewers that the subsequent material being presented is not programming but rather sponsored advertising. These commercial break intros vary in nature but may include certain logos, characters, or other specific video and audio messages to indicate that the subsequent material is not programming but rather advertising. The return to programming may in some instances also be preceded by a commercial break outro which is a short video segment that indicates the return to programming. In some cases the intros and the outros may be the same with an identical programming segment being used for both the intro and the outro. Detecting the potential presence of the commercial break intros or outros may indicate that an advertisement (or advertisement block) is about to begin or end respectively. If the intros and/or outros were always the same, detection could be done by detecting the existence of specific video or audio, or specific logos or characters in the video stream, or by detecting specific features about the video stream (e.g., CCVs). However, the intros and/or outros need not be the same. The intros/outros may vary based on at least some subset of day, time, channel (network), program, and advertisement (or advertisement break).

Intros may be several frames of video easily recognized by the viewer, but may also be icons, graphics, text, or other representations that do not cover the entire screen or which are only shown for very brief periods of time.

Increasingly, broadcasters are also selling sponsorship of certain programming which means that a sponsor's short message appears on either side (beginning or end) of each ad break during that programming. These sponsorship messages can also be used as latent cue tones indicating the start and end of ad breaks.

The detection of the intros, outros, and/or sponsorship messages may be based on comparing the incoming video stream, to a plurality of known intros, outros, and/or sponsorship messages. This would require that each of a plurality of known intros, outros, and/or sponsorship messages be stored and that the incoming video stream be compared to each. This may require a large amount of storage and may require significant processing as well, including the use of non-real-time processing. Such storage and processing may not be feasible or practical, especially for real time detection systems. Moreover, storing the known advertisements for comparing to the video programming could potentially be considered a copyright violation.

The detection of the intros, outros, and/or sponsorship messages may be based on detecting messages, logos or characters within the video stream and comparing them to a plurality of known messages, logos or characters from known intros, outros, and/or sponsorship messages. The incoming video may be processed to find these messages, logos or characters. The known messages, logos or characters would need to be stored in advance along with an association to an intro or outro. The comparison of the detected messages, logos or characters to the known messages, logos or characters may require significant processing, including the use of non-real-time processing. Moreover, storing the known messages, logos or characters for comparison to messages, logos or characters from the incoming video stream could potentially be considered a copyright violation.

The detection of the intros, outros, and/or sponsorship messages may be based on detecting messages within the video stream and determining the meaning of the words (e.g., detecting text in the video stream and analyzing the text to determine if it means an advertisement is about to start).

Alternatively, the detection may be based on calculating features (statistical parameters) about the incoming video stream. The features calculated may include, for example, color histograms or CCVs as discussed above. The features may be calculated for an entire video frame, as discussed above, number of frames, or may be calculated for evenly/randomly highly subsampled representations of the video frame. For example, the video frame could be sampled at a number (e.g., 64) of random locations or regions in the video frame and parameters such as average color) may be computed for each of these regions. The subsampling can also be performed in the temporal domain. The collection of features including CCVs for a plurality of images/frames, color histograms for a plurality of regions, may be referred to as a fingerprint.

FIG. 7 illustrates an exemplary pixel grid 700 for a video frame. For ease of understanding, we limit the pixel grid to 12×12 (144 pixels), limit the color variations for each color (RGB) to the two most significant bits (4 color variations), and have each pixel have the same number associated with each of the colors (RGB) so that a single number represents all colors. A plurality of regions 710, 720, 730, 740, 750, 760, 770, 780, 785, 790, 795 of the pixel grid 700 are sampled and an average color for each of the regions 710, 720, 730, 740, 750, 760, 770, 780, 785, 790, 795 is calculated. For example, the region 710 has an average color of 1.5, the region 790 has an average color of 0.5 and the region 795 has an average color of 2.5.

One advantage of the sampling of regions of a frame instead of an entire frame is that the entire frame would not need to be copied in order to calculate the features (if copying was even needed to calculate the features). Rather, certain regions of the image may be copied in order to calculate the features for those regions. As the regions of the frame would provide only a partial image and could not be used to recreate the image, there would be less potential copyright issues. As will be discussed in more detail later, the generation of fingerprints for known entities (e.g., advertisements, intros) that are stored in a database for comparison could be done for regions as well and therefore create less potential copyright issues.

Figure 8:
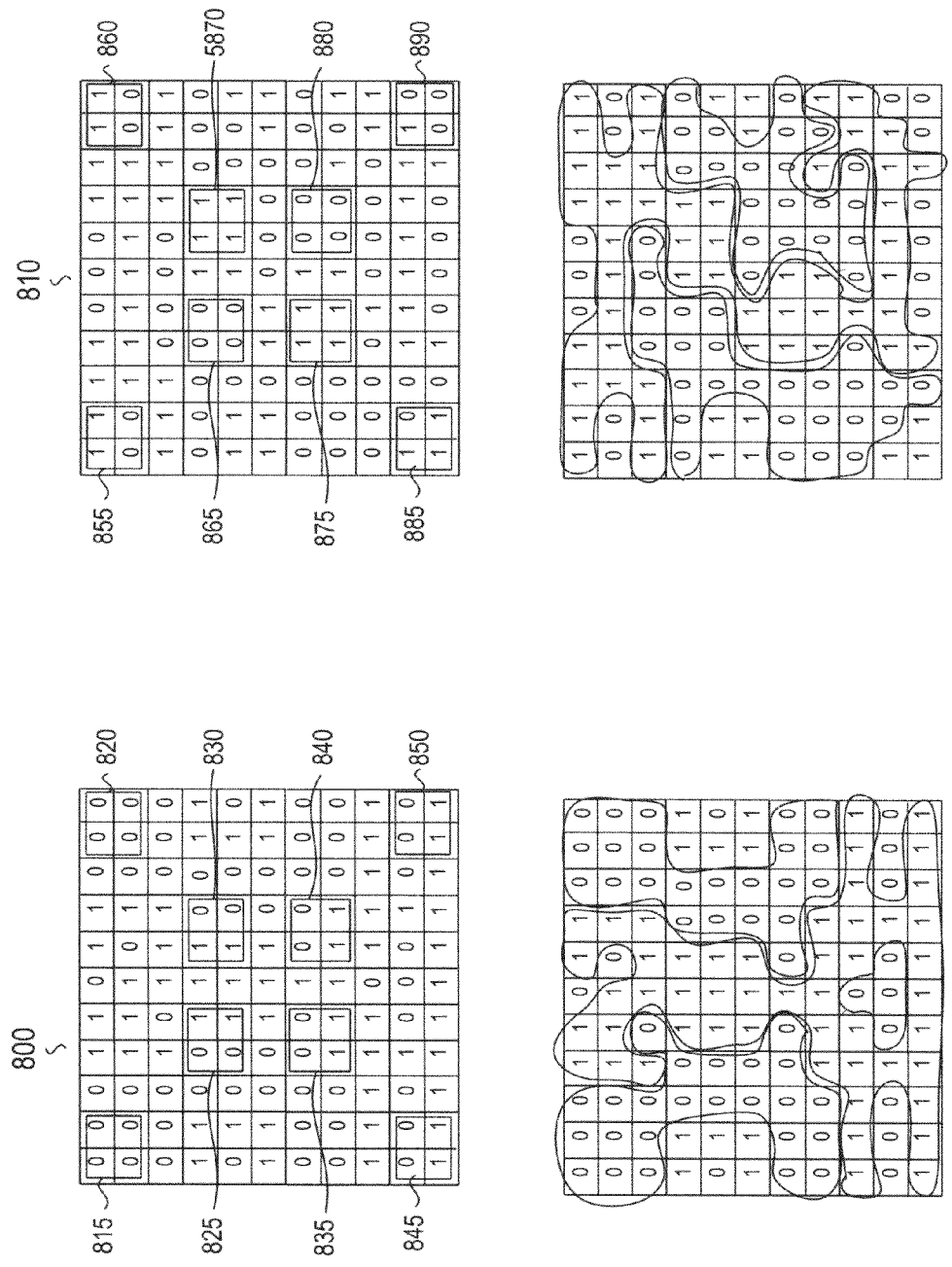
FIG. 8 illustrates two exemplary pixel grids having a plurality of regions for sampling and coherent and incoherent pixels identified, according to one embodiment.

FIG. 8 illustrates two exemplary pixel grids 800 and 810. Each of the pixel grids is 11×11 (121 pixels) and is limited to a single bit (0 or 1) for each of the colors. The top view of each pixel grid 800, 810 has a plurality of regions identified 815-850 and 855-890 respectively. The lower view of each pixel grids 800, 810 has the coherent and incoherent pixels identified, where the threshold level is greater than 5.

FIG. 9 illustrates exemplary comparisons of the pixel grids 800, 810 of FIG. 8. Color histograms 900, 910 are for the entire frame 800, 810 respectively and the difference in the color histograms 920 is 0. CCVs 930, 940 are for the entire frame 800, 810 respectively and the difference in the CCVs 950 is 0. Average colors 960, 970 capture the average colors for the various identified regions in frames 800, 810. The difference is the average color of the regions 980 is 3.5 (using the sum of absolute values).

FIGS. 7-9 focused on determining the average color for each of the regions but the techniques illustrated therein are not limited to average color determinations. For example, a color histogram or CCV could be generated for each of these regions. For CCVs to provide useful benefits the regions would have to be big enough or all of the colors will be incoherent. All of the colors will be coherent if the coherent threshold is made too low.

The calculated features/fingerprints (e.g., CCVs, evenly/ randomly highly subsampled representations) are compared to corresponding features/fingerprints for known intros and/ or outros. The fingerprints for the known intros and outros could be calculated and stored in advance. The comparison of calculated features of the incoming video stream (statistical parameterized representations) to the stored fingerprints for known intros/outros will be discussed in more detail later.

Another method for detecting the presentation of an advertisement is automatic detection of the advertisement. Automatic detection techniques may include recognizing that the incoming video stream is a known advertisement. Recognition techniques may include comparing the incoming video stream to known video advertisements. This would require that each of a plurality of known video advertisements be stored in order to do the comparison. This would require a relatively large amount of storage and would likely require significant processing, including non-real-time processing. Such storage and processing may not be feasible or practical, especially for real time detection systems. Moreover, storing the known advertisements for comparison to the video programming could potentially be considered a copyright violation.

Accordingly, a more practical automatic advertisement recognition technique may be used to calculate features (statistical parameters) about the incoming video stream and to compare the calculated features to a database of the same features (previously calculated) for known advertisements. The features may include color histograms, CCVs, and/or evenly/randomly highly subsampled representations of the video stream as discussed above or may include other features such as text and object recognition, logo or other graphic overlay recognition, and unique spatial frequencies or patterns of spatial frequencies (e.g., salient points). The features may be calculated for images (e.g., frames) or portions of images (e.g., portions of frames). The features may be calculated for each image (e.g., all frames) or for certain images (e.g., every I-frame in an MPEG stream). The combination of features for different images (or portions of images) make up a fingerprint. The fingerprint (features created from multiple frames or frame portions) may include unique temporal characteristics instead of, or in addition to, the unique spatial characteristics of a single image.

The features/fingerprints for the known advertisements or other segments of programming (also referred to as known video entities) may have been pre-calculated and stored at the detection point. For the known advertisements, the fingerprints may be calculated for the entire advertisement so that the known advertisement fingerprint includes calculated features for the entire advertisement (e.g., every frame for an entire 30-second advertisement). Alternatively, the fingerprints may be calculated for only a portion of the known advertisements (e.g., 5 seconds). The portion should be large enough so that effective matching to the calculated fingerprint for the incoming video stream is possible. For example, an effective match may require comparison of at least a certain number of images/frames (e.g., 10) as the false negatives may be high if less comparison is performed.

Figure 10:
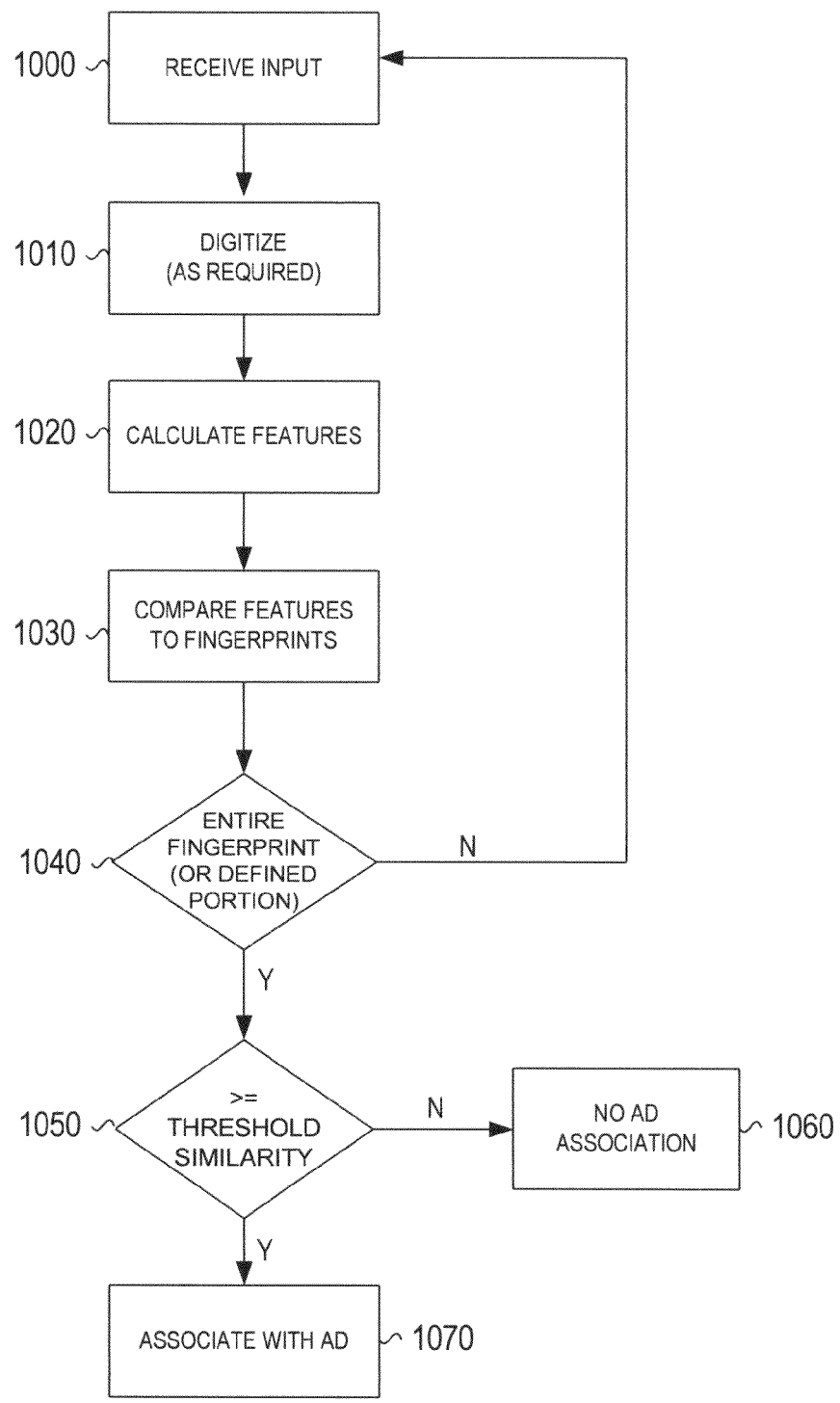
FIG. 10 illustrates an exemplary flow-chart of the advertisement matching process, according to one embodiment.

FIG. 10 illustrates an exemplary flowchart of the advertisement matching process. Initially, the video stream is received 1000. The received video stream may be analog or digital video. The processing may be done in either analog or digital but is computationally easier as digital video (accordingly digital video may be preferred). Therefore, the video stream may be digitized 1010 if it is received as analog video. Features (statistical parameters) are calculated for the video stream 1020. The features may include CCVs, color histograms, other statistical parameters, or a combination thereof. As mentioned above the features can be calculated for images or for portions of images. The calculated features/fingerprints are compared to corresponding fingerprints (e.g., CCVs are compared to CCVs) for known advertisements 1030. According to one embodiment, the comparison is made to the prestored fingerprints of a plurality of known advertisements (fingerprints of known advertisements stored in a database).

The comparison 1030 may be made to the entire fingerprint for the known advertisements, or may be made after comparing to some portion of the fingerprints (e.g., 1 second which is approximately 25 frames, 35 frames which is approximately 1.4 seconds) that is large enough to make a determination regarding similarity. A determination is made as to whether the comparison was to entire fingerprints (or some large enough portion) 1040. If the entire fingerprint (or large enough portion) was not compared (1040 No) additional video stream will be received and have features calculated and compared to the fingerprint (1000-1030). If the entire fingerprint (or large enough portion) was compared (1040 Yes) then a determination is made as to whether the features of the incoming video stream meets a threshold level of similarity with any of the fingerprints 1050. If the features for the incoming video stream do not meet a threshold level of similarity with one of the known advertisement fingerprints (1050 No) then the incoming video stream is not associated with a known advertisement 1060. If the features for the incoming video stream meet a threshold level of similarity with one of the known advertisement fingerprints (1050 Yes) then the incoming video stream is associated with the known advertisement (the incoming video stream is assumed to be the advertisement) 1070.

Once it is determined that the incoming video stream is an advertisement, ad substitution may occur. Targeted advertisements may be substituted in place of all advertisements within an advertisement block. The targeted advertisements may be inserted in order or may be inserted based on any number of parameters including day, time, program, last time ads were inserted, and default advertisement (advertisement it is replacing). For example, a particular advertisement may be next in the queue to be inserted as long as the incoming video stream is not tuned to a particular program (e.g., a Nike® ad may be next in the queue but may be restricted from being substituted in football games because Adidas® is a sponsor of the football league). Alternatively, the targeted advertisements may only be inserted in place of certain default advertisements. The determination of which default ads should be substituted with targeted ads may be based on the same or similar parameters as noted above with respect to the order of targeted ad insertion. For example, beer ads may not be substituted in a bar, especially if the bar sells that brand of beer.

Conversely, if a default ad for a competitor hotel is detected in the incoming video stream at a hotel the default ad should be replaced with a targeted ad.

The process described above with respect to FIG. 10 is focused on detecting advertisements within the incoming video stream. However, the process is not limited to advertisements. For example, the same or similar process could be used to compare calculated features for the incoming video stream to a database of fingerprints for known intros (if intros are used in the video delivery system) or known sponsorships (if sponsorships are used). If a match is detected that would indicate that an intro is being displayed and that an advertisement break is about to begin. Ad substitution could begin once the intro is detected. Targeted advertisements may be inserted for an entire advertisement block (e.g., until an outro is detected). The targeted advertisements may be inserted in order or may be inserted based on any number of parameters including day, time, program, and last time ads were inserted. Alternatively, the targeted advertisements may only be inserted in place of certain default advertisements. To limit insertion of targeted advertisements to specific default advertisements would require the detection of specific advertisements.

The intro or sponsorship may provide some insight as to what ads may be played in the advertisement block. For example, the intro detected may be associated with (often played prior to) an advertisement break in a soccer game and the first ad played may normally be a beer advertisement. This information could be used to limit the comparison of the incoming video stream to ad fingerprints for known beer advertisements as stored in an indexed ad database or could be used to assist in the determination of which advertisement to substitute. For example, a restaurant that did not serve alcohol may want to replace the beer advertisement with an advertisement for a non-alcoholic beverage.

The level of similarity is based on the minimal number of substitutions, deletions and insertions of features necessary to align the features of the incoming video stream with a fingerprint (called approximates substring matching). It is regarded as a match between the fingerprint sequences for the incoming video stream and a known advertisement if the minimal distance between does not exceed a distance threshold and the difference in length of the fingerprints does not exceed a length difference threshold. Approximate substring matching may allow detection of commercials that have been slightly shortened or lengthened, or whose color characteristics have been affected by different modes or quality of transmission.

Advertisements only make up a portion of an incoming video stream so that continually calculating features for the incoming video stream 1020 and comparing the features to known advertisement fingerprints 1030 may not be efficient. The feature based techniques described above (e.g., volume increases, increase scene changes, monochrome images) may be used to detect the start of a potential advertisement (or advertisement block) and the calculating of features 1020 and comparing to known fingerprints 1030 may only be performed once a possible advertisement break has been detected. It should be noted that some methods of detecting the possibility of an advertisement break in the video stream such as an increase in scene changes, where scene changes may be detected by comparing successive CCVs, may in fact be calculating features of the video stream 1020 so the advertisement detection process may begin with the comparison 1030.

The calculating of features 1020 and comparing to known fingerprints 1030 may be limited to predicted advertisement break times (e.g., between :10 and :20 after every hour). The generation 1020 and the comparison 1030 may be based on the channel to which it is tuned. For example, a broadcast channel may have scheduled advertisement blocks so that the generation 1020 and the comparison 1030 may be limited to specific times. However, a live event such as a sporting event may not have fixed advertisement blocks so time limiting may not be an option. Moreover channels are changed at random times, so time blocks would have to be channel specific.

When intros are used, the calculated fingerprint for the incoming video stream may be continually compared to fingerprints for known intros stored in a database (known intro fingerprints). After an intro is detected indicating that an advertisement (or advertisement block) is about to begin, the comparison of the calculated fingerprint for the incoming video stream to fingerprints for known advertisements stored in a database (known advertisement fingerprints) begins.

If an actual advertisement detection is desired, a comparison of the calculated fingerprints of the incoming video stream to the known advertisement fingerprints stored in a database will be performed whether the comparison is continual or only after some event (e.g., detection of intro, certain time). Comparing the calculated fingerprint of the incoming video stream to entire fingerprints (or portions thereof) for all the known advertisement fingerprints 1030 may not be an efficient use of resources. The calculated fingerprint may have little or no similarity with a percentage of the known advertisement fingerprints and this difference may be obvious early in the comparison process. Accordingly, continuing to compare the calculated fingerprint to these known advertisement fingerprints is a waste of resources.

An initial window (e.g., several frames, several regions of a frame) of the calculated fingerprint of the incoming video steam may be compared to an initial window of all of the known advertisement fingerprints (e.g., several frames, several regions). Only the known advertisement fingerprints that have less than some defined level of dissimilarity (e.g., less than a certain distance between them) proceed for further comparison. The initial window may be, for example, a certain period (e.g., 1 second), a certain number of images (e.g., first 5 I-frames), or a certain number of regions of a frame (e.g., 16 of 64 regions of frame).

Figure 11:
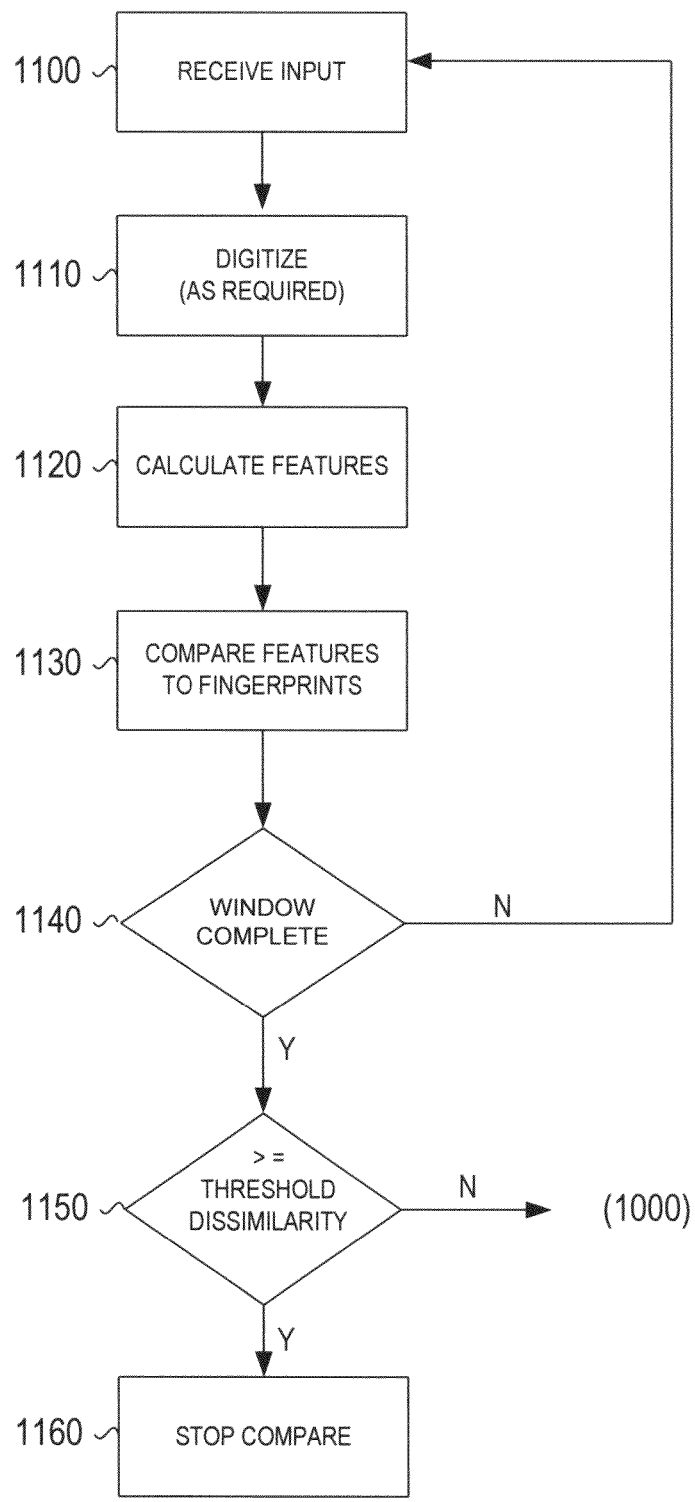
FIG. 11 illustrates an exemplary flow-chart of an initial dissimilarity determination process, according to one embodiment.

FIG. 11 illustrates an exemplary flowchart of an initial dissimilarity determination process. The video stream is received 1100 and may be digitized 1110 (e.g., if it is received as analog video). Features (statistical parameters) are calculated for the video stream (e.g., digital video stream) 1120. The features (fingerprint) may include CCVs, color histograms, other statistical parameters, or a combination thereof. The features can be calculated for images or for portions of images. The calculated features (fingerprint) are compared to the fingerprints for known advertisements 1130 (known advertisement fingerprints). A determination is made as to whether the comparison has been completed for an initial period (window) 1140. If the initial window comparison is not complete (1140 No) the process returns to 1100-1130. If the initial window comparison is complete (1140 Yes) then a determination is made as to the level of dissimilarity (distance) between the calculated fingerprint and the known advertisement fingerprints exceeding a threshold 1150. If the dissimilarity is below the threshold, the process proceeds to FIG. 10 (1000) for those fingerprints. For the known advertisement fingerprints that the threshold is exceeded (1150 Yes) the comparing is aborted.

FIG. 12 illustrates an exemplary initial comparison of the calculated fingerprint for an incoming stream versus initial portions of fingerprints for a plurality of known advertisements stored in a database (known advertisement fingerprints). For ease of understanding we will assume that each color is limited to a single digit (two colors), that each color has the same digit so that a single number can represent all colors, and that the pixel grid is 25 pixels. The calculated fingerprint includes a CCV for each image (e.g., frame, I-frame). The incoming video stream has a CCV calculated for the first three frames. The CCV for the first three frames of the incoming stream are compared to the associated portion (CCVs of the first three frames) of each of the known advertisement fingerprints. The comparison includes summating the dissimilarity (e.g., calculated distance) between corresponding frames (e.g., distance Frame 1+distance Frame 2+distance Frame 3). The distance between the CCVs for each of the frames can be calculated in various manners including the sum of the absolute difference and the sum of the squared differences as described above. The sum of the absolute differences is utilized in FIG. 12. The difference between the incoming video steam and a first fingerprint ($FP_1$) is 52 while the difference between the incoming video stream and the Nth fingerprint ($FP_N$) is 8. If the predefined level of dissimilarity (distance) was 25, then the comparison for $FP_1$ would not proceed further (e.g., 1160) since the level of dissimilarity exceeds the predefined level (e.g., 1150 Yes). The comparison for $FP_N$ would continue (e.g., proceed to 1000) since the level of dissimilarity did not exceed the predefined level (e.g., 1150 No).

It is possible that the incoming video stream may have dropped the first few frames of the advertisement or that the calculated features (e.g., CCV) are not calculated for the beginning of the advertisement (e.g., first few frames) because, for example, the possibility of an advertisement being presented was not detected early enough. In this case, if the comparison of the calculated features for the first three frames is compared to the associated portion (calculated features of the first three frames) of each of the known advertisement fingerprints, the level of dissimilarity may be increased erroneously since the frames do not correspond. One way to handle this is to extend the length of the fingerprint window in order to attempt to line the frames up.

FIG. 13 illustrates an exemplary initial comparison of calculated features for an incoming stream versus an expanded initial portion of known advertisement fingerprints. For ease of understanding one can make the same assumptions as with regard to FIG. 12. The CCVs calculated for the first three frames of the incoming video stream are compared by a sliding window to the first five frames for a stored fingerprint. That is, frames 1-3 of the calculated features of the incoming video stream are compared against frames 1-3 of the fingerprint, frames 2-4 of the fingerprint, and frames 3-5 of the fingerprint. By doing this it is possible to reduce or eliminate the differences that may have been caused by one or more frames being dropped from the incoming video stream. In the example of FIG. 13, the first two frames of the incoming stream were dropped. Accordingly, the difference between the calculated features of the incoming video stream equated best to frames 3-5 of the fingerprint.

If the comparison between the calculated features of the incoming stream and the fingerprint have less dissimilarity then the threshold, the comparison continues. The comparison may continue from the portion of the fingerprint where the best match was found for the initial comparison. In the exemplary comparison of FIG. 13, the comparison should continue between frame 6 (next frame outside of initial window) of the fingerprint and frame 4 of incoming stream. It should be noted that if the comparison resulted in the best match for frames 1-3 of the fingerprint, then the comparison may continue starting at frame 4 (next frame within the initial window) for the fingerprint.

To increase the efficiency by limiting the amount of comparisons being performed, the window of comparison may continually be increased for the known advertisement fingerprints that do not meet or exceed the dissimilarity threshold until one of the known advertisement fingerprints possibly meets or exceeds the similarity threshold. For example, the window may be extended 5 frames for each known advertisement fingerprint that does not exceed the dissimilarity threshold. The dissimilarity threshold may be measured in distance (e.g., total distance, average distance/frame). Comparison is stopped if the incoming video fingerprint and the known advertisement fingerprint differ by more than a chosen dissimilarity threshold. A determination of a match would be based on a similarity threshold. A determination of the similarity threshold being met or exceeded may be delayed until some predefined number of frames (e.g., 20) have been compared to ensure a false match is not detected (small number of frames being similar). Like the dissimilarity threshold, the similarity threshold may be measured in distance. For example, if the distance between the features for the incoming video stream and the fingerprint differ by less then 5 per frame after at least 20 frames are compared it is considered a match.

Figure 14:
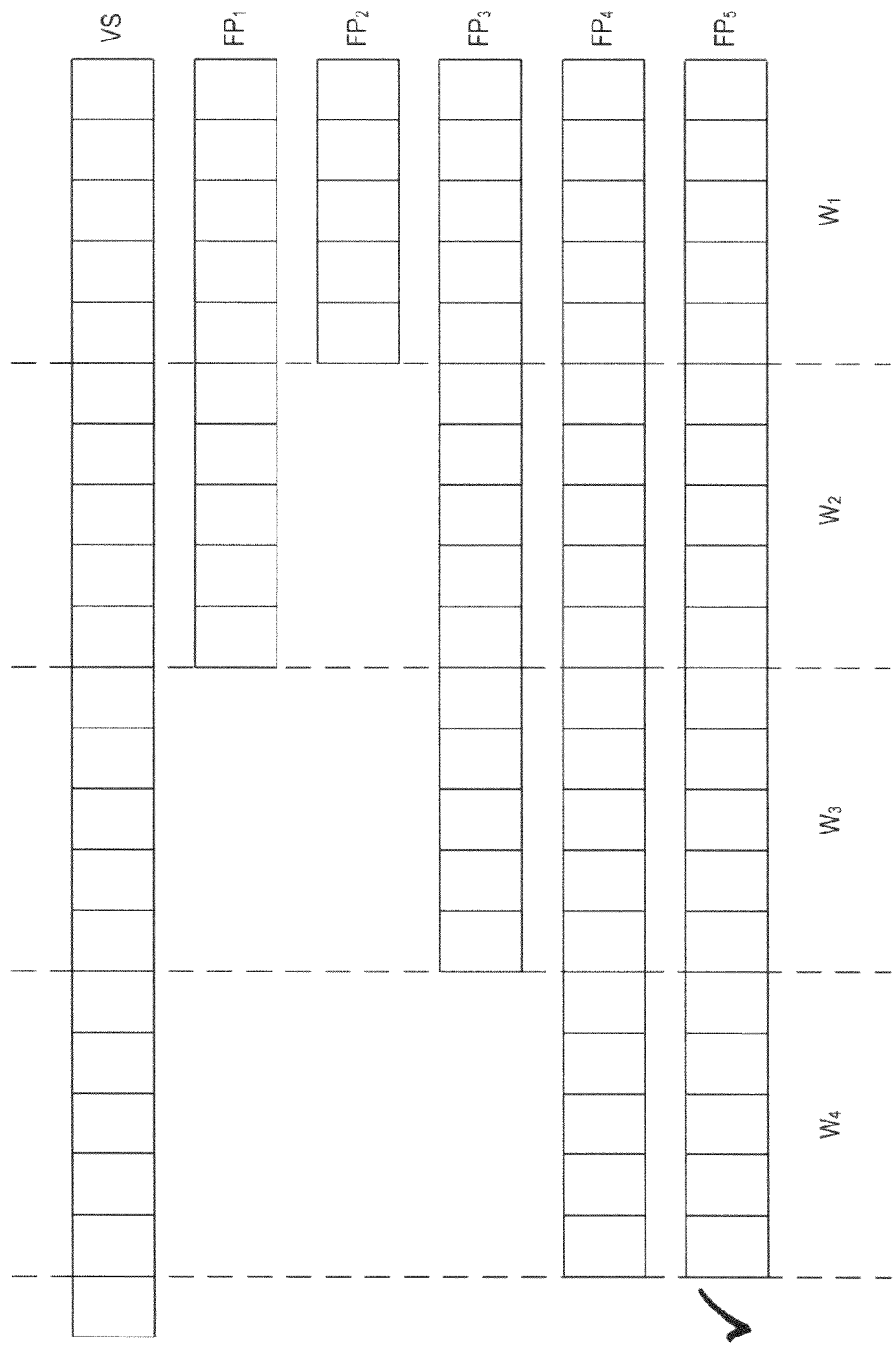
FIG. 14 illustrates an exemplary expanding window comparison of the features of the incoming video stream and the features of the fingerprints of known advertisements, according to one embodiment.

FIG. 14 illustrates an exemplary expanding window comparison of the features of the incoming video stream and the features of the fingerprints of known advertisements. For the initial window $W_1$, the incoming video stream is compared to each of five known advertisement fingerprints ($FP_1$-$FP_5$). After $W_1$, the comparison of $FP_2$ is aborted because it exceeded the dissimilarity threshold. The comparison of the remaining known advertisement fingerprints continues for the next window $W_2$ (e.g., next five frames, total of 10 frames). After $W_2$, the comparison of $FP_1$ is aborted because it exceeded the dissimilarity threshold. The comparison of the remaining known advertisement fingerprints continues for the next window $W_3$ (e.g., next five frames, total of 15 frames). After $W_3$, the comparison of $FP_3$ is aborted. The comparison of the remaining known advertisement fingerprints continues for the next window $W_4$ (e.g., next five frames, total of 20 frames). After $W_4$, a determination can be made about the level of similarity. As illustrated, it was determined that $FP_5$ meets the similarity threshold.

If neither of the known advertisement fingerprints ($FP_4$ or $FP_5$) meet the similarity threshold, the comparison would continue for the known advertisement fingerprints that did not exceed the dissimilarity threshold. Those that meet the dissimilarity threshold would not continue with the comparisons. If more then one known advertisement fingerprint meets the similarity threshold then the comparison may continue until one of the known advertisement fingerprints falls outside of the similarity threshold, or the most similar known advertisement fingerprint is chosen.

The windows of comparison in FIG. 14 (e.g., 5 frames) may have been a comparison of temporal alignment of the frames, a summation of the differences between the individual frames, a summation of the differences of individual regions of the frames, or some combination thereof. It should also be noted, that the window is not limited to a certain number of frames as illustrated and may be based on regions of a frame (e.g., 16 of the 32 regions the frame is divided into). If the window was for less than a frame, certain fingerprints may be excluded from further comparisons after comparing less than a frame. It should be noted that the level of dissimilarity may have to be high for comparisons of less than a frame so as not to exclude comparisons that are temporarily high due to, for example, misalignment of the fingerprints.

The calculated features for the incoming video stream do not need to be stored. Rather, they can be calculated, compared and then discarded. No video is being copied or if the video is being copied it is only for a short time (temporarily) while the features are calculated. The features calculated for images can not be used to reconstruct the video, and the calculated features are not copied or if the features are copied it is only for a short time (temporarily) while the comparison to the known advertisement fingerprints is being performed.

As previously noted, the features may be calculated for an image (e.g., frame) or for a portion or portions of an image. Calculating features for a portion may entail sampling certain regions of an image as discussed above with respect to FIGS. 7-9 above. Calculating features for a portion of an image may entail dividing the image into sections, selecting a specific portion of the image or excluding a specific portion of the image. Selecting specific portions may be done to focus on specific areas of the incoming video stream (e.g., network logo, channel identification, program identification). The focus on specific areas will be discussed in more detail later. Excluding specific portions may be done to avoid overlays (e.g., network logo) or banners (e.g., scrolling news, weather or sport updates) that may be placed on the incoming video stream that could potentially affect the matching of the calculated features of the video stream to fingerprints, due to the fact that known advertisements might not have had these overlays and/or banners when the original library fingerprints were generated.

Figure 15:
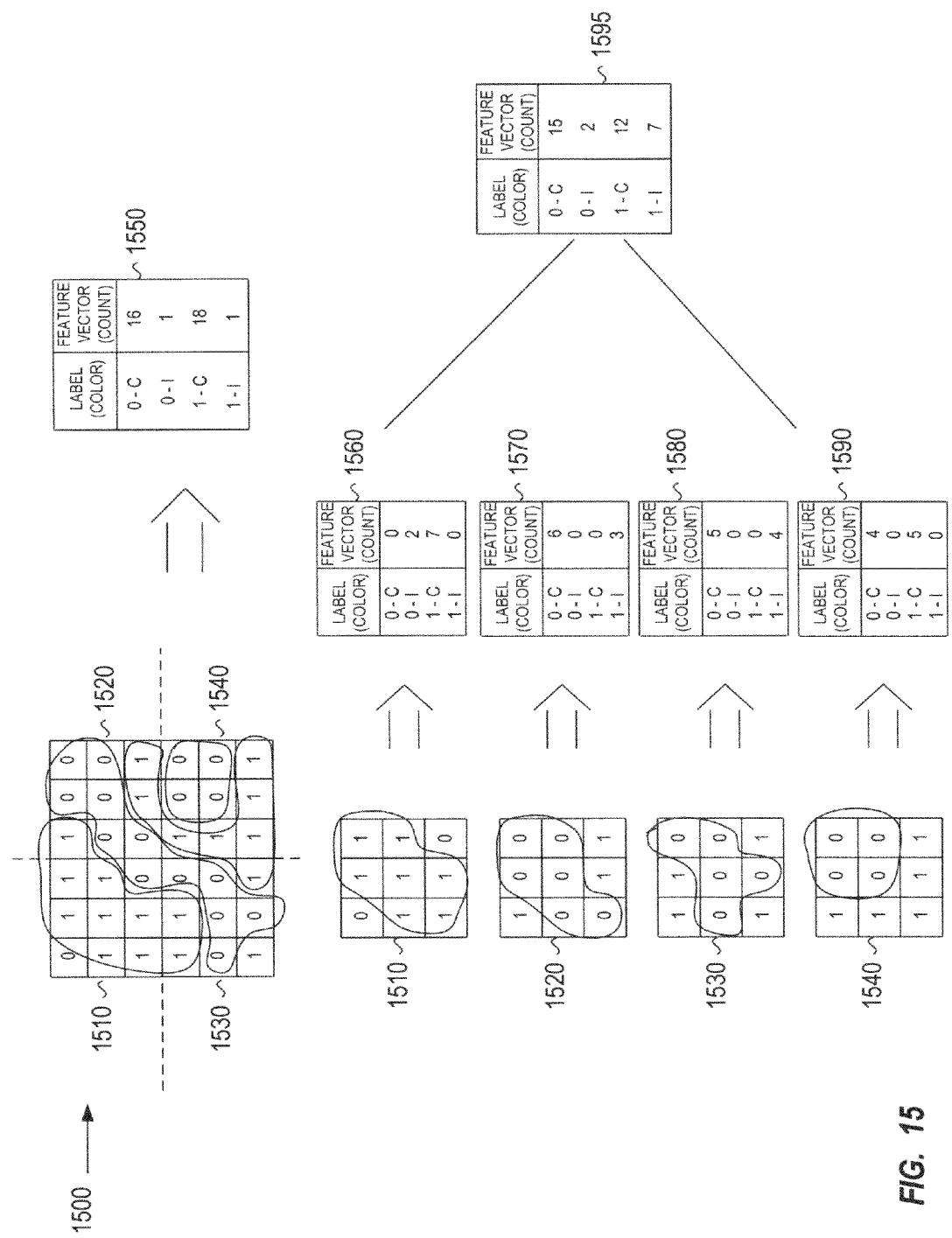
FIG. 15 illustrates an exemplary pixel grid divided into sections, according to one embodiment.

FIG. 15 illustrates an exemplary pixel grid 1500 divided into sections 1510, 1520, 1530, 1540 as indicated by the dotted line. The pixel grid 1500 consists of 36 pixels (a 6×6 grid) and a single digit for each color with each pixel having the same number associated with each color. The pixel grid 1500 is divided into 4 separate 3×3 grids 1510-1540. A full image CCV 1550 is generated for the entire grid 1500, and partial image CCVs 1560, 1570, 1580, 1590 are generated for the associated sections 1510-1540. A summation of the section CCVs 1595 would not result in the CCV 1550 as the pixels may have been coherent because they were grouped over section borders which would not be indicated in the summation CCV 1595. It should be noted that the summation CCV 1595 is simply for comparing to the CCV 1550 and would not be used in a comparison to fingerprints. When calculating CCVs for sections the coherence threshold may be lowered. For example, the coherence threshold for the overall grid was four and may have been three for the sections. It should be noted that if it was lowered to 2 that the color 1 pixels in the lower right corner of section pixel grid 1520 would be considered coherent and the CCV would change accordingly to reflect this fact.

If the image is divided into sections, the comparison of the features associated with the incoming video stream to the features associated with known advertisements may be done based on sections. The comparison may be based on a single section. Comparing a single section by itself may have less granularity then comparing an entire image.

Figure 16:
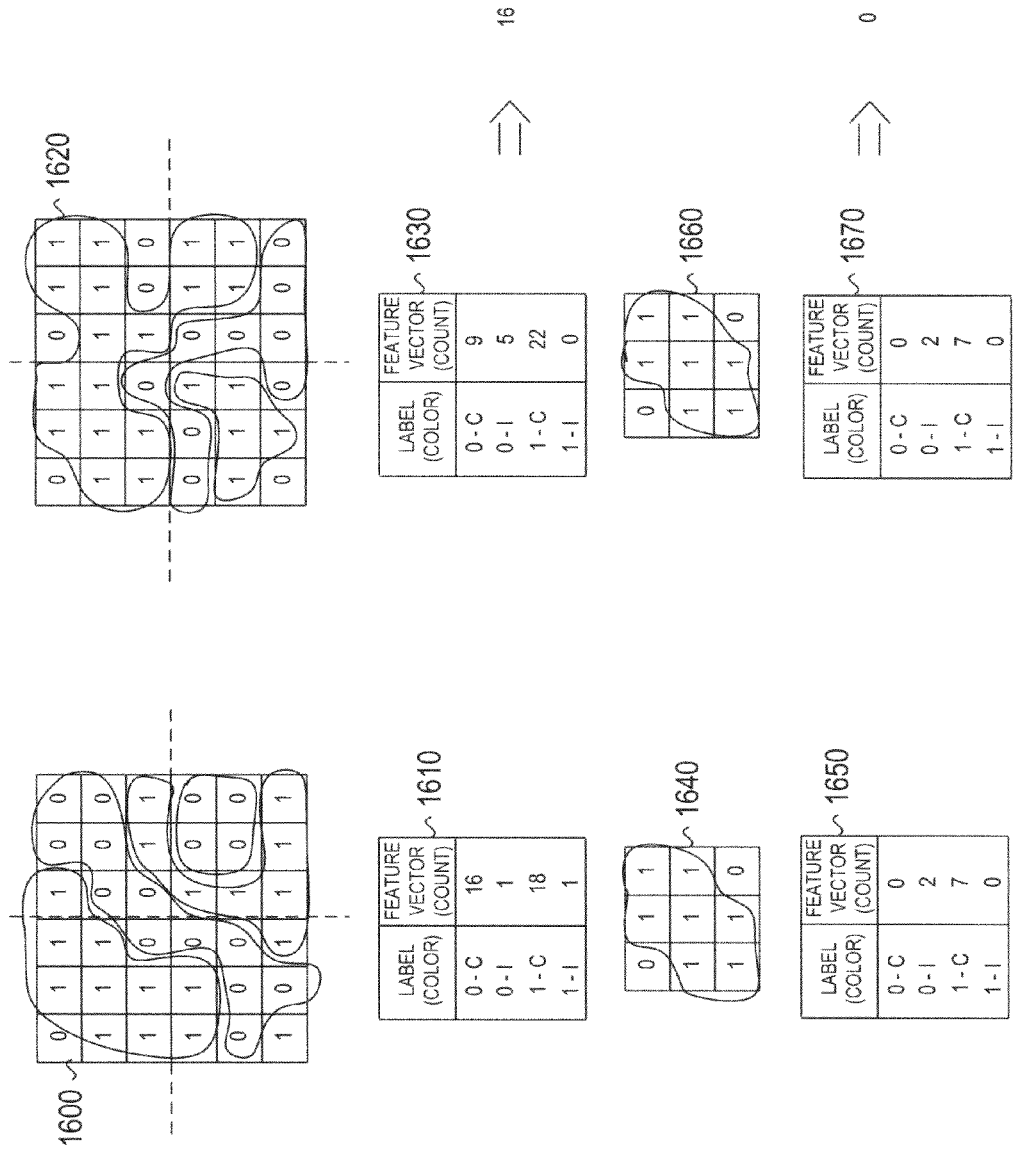
FIG. 16 illustrates an exemplary comparison of two whole images and corresponding sections of the two images, according to one embodiment.

FIG. 16 illustrates an exemplary comparison of two images 1600, 1620 based on the whole images 1600, 1620 and sections of the images 1640, 1660 (e.g., upper left quarter of image). Features (CCVs) 1610, 1630 are calculated for the images 1600, 1620 and reveal that the difference (distance) between them is 16 (based on sum of absolute values). Features (CCVs) 1650, 1670 are calculated for the sections 1640, 1660 and reveal that there is no difference. The first sections 1640, 1660 of the images were the same while the other sections were different thus comparing only the features 1650, 1670 may erroneously result in not being filtered (not exceeding dissimilarity threshold) or a match (exceeding similarity threshold). A match based on this false positive would not be likely, as in a preferred embodiment a match would be based on more then a single comparison of calculated features for a section of an image in an incoming video stream to portions of known advertisement fingerprints. Rather, the false positive would likely be filtered out as the comparison was extended to further sections. In the example of FIG. 16, when the comparison is extended to other sections of the image or other sections of additional images the appropriate weeding out should occur.

It should be noted that comparing only a single section may provide the opposite result (being filtered or not matching) if the section being compared was the only section that was different and all the other sections were the same. The dissimilarity threshold will have to be set at an appropriate level to account for this possible effect or several comparisons will have to be made before a comparison can be terminated due to a mismatch (exceeding dissimilarity threshold).

Alternatively, the comparison of the sections may be done at the same time (e.g., features of sections 1-4 of the incoming video stream to features of sections 1-4 of the known advertisements). As discussed above, comparing features of sections may require thresholds (e.g., coherence threshold) to be adjusted. Comparing each of the sections individually may result in a finer granularity then comparing the whole image.

Figure 17:
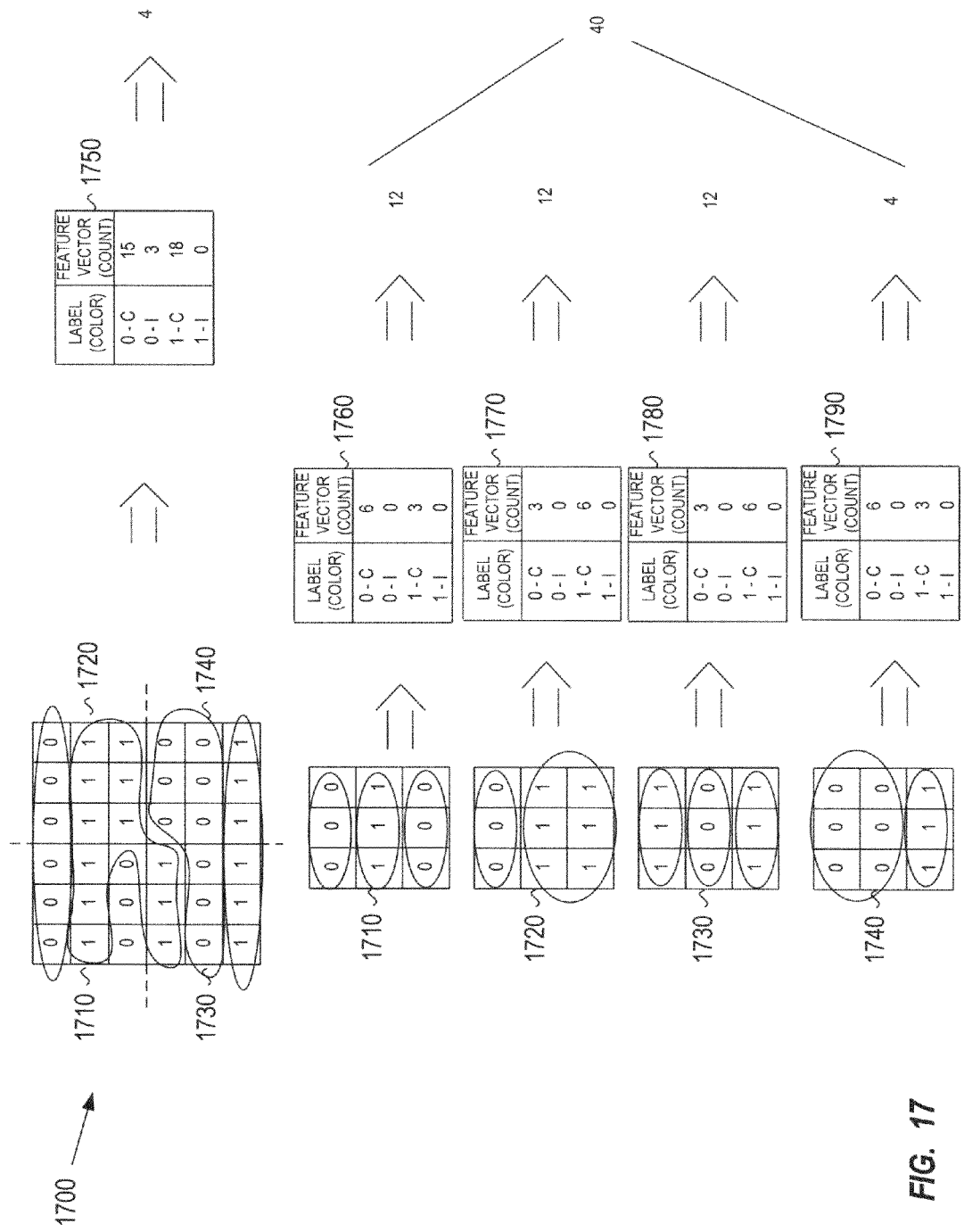
FIG. 17 illustrates an exemplary comparison of pixel grids by sections, according to one embodiment.

FIG. 17 illustrates an exemplary comparison of a pixel grid 1700 (divided into sections 1710, 1720, 1730, 1740) to the pixel grid 1500 (divided into sections 1510, 1520, 1530, 1540) of FIG. 15. By simply comparing the pixel grids 1500 and 1700 it can be seen that the color distribution is different. However, comparing a CCV 1750 of the pixel grid 1700 and the CCV 1550 of the pixel grid 1500 results in a difference (distance) of only 4. However, comparing CCVs 1760-1790 for sections 1710-1740 to the CCVs 1560-1590 for sections 1510-1540 would result in differences of 12, 12, 12 and 4 respectively, for a total difference of 40.

It should be noted that FIGS. 15-17 depicted the image being divided into four quadrants of equal size, but is not limited thereto. Rather the image could be divided in numerous ways without departing from the scope (e.g., row slices, column slices, sections of unequal size and/or shape). The image need not be divided in a manner in which the whole image is covered. For example, the image could be divided into a plurality of random regions as discussed above with respect to FIGS. 7-9. In fact, the sections of an image that are analyzed and compared are only a portion of the entire image and could not be used to recreate the image so that there could clearly be no copyright issues. That is, certain portions of the image are not captured for calculating features or for comparing to associated portions of the known advertisement fingerprints that are stored in a database. The known advertisement fingerprints would also not be calculated for entire images but would be calculated for the same or similar portions of the images.

FIGS. 11-14 discussed comparing calculated features for the incoming video stream to windows (small portions) of the fingerprints at a time so that likely mismatches need not be continually compared. The same basic process can be used with segments. If the features for each of the segments for an image are calculated and compared together (e.g., FIG. 17) the process may be identical except for the fact that separate features for an image are being compared instead of a single feature. If the features for a subset of all the sections are generated and compared, then the process may compare the features for that subset of the incoming video stream to the features for that subset of the advertisement fingerprints. For the fingerprints that do not exceed the threshold level of dissimilarity (e.g., 1150 No of FIG. 11) the comparison window may be expanded to the additional segments of the image and fingerprints or may be extended to the same section of additional images. When determining if there is a match between the incoming video stream and a fingerprint for a known ad (e.g., 1050 of FIG. 10), the comparison is likely not based on a single section/region as this may result in erroneous conclusions (as depicted in FIG. 16). Rather, it is preferable if the determination of a match is made after sufficient comparisons of sections/regions (e.g., a plurality of sections of an image, a plurality of images).

For example, a fingerprint for an incoming video stream (query fingerprint q) may be based on an image (or portion of an image) and consist of features calculated for different regions ($q_1, q_2 \ldots q_n$) of the image. The fingerprints for known advertisements (subject fingerprints s) may be based on images and consist of features calculated for different regions ($s_1, s_2 \ldots s_m$) of the images. The integer m (the number of regions in an image for a stored fingerprint) may be greater then the integer n (number of regions in an image of incoming video stream) if the fingerprint of the incoming video stream is not for a complete image. For example, regions may not be defined for boundaries on an incoming video stream due to the differences associated with presentation of images for different TVs and/or STBs. A comparison of the fingerprints would (similarity measure) be the sum for i=1 to n of the minimum distance between $q_i$ and $s_j$, where i is the particular region. Alternatively the Earth Movers distance could be used. The Earth Movers distance is defined as the minimal changes necessary to transform the features in region q1, ... , qn into the reference features of region s1, ... , sm. This distance can usually be efficient compute by means of solving a special linear program called the optimal (partial) flow computation."

Some distance measures may not really be affected by calculating a fingerprint (q) based on less then the whole image. However, it might accidentally match the wrong areas since features may not encode any spatial distribution. For instance, areas which are visible in the top half of the incoming video stream and are used for the calculation of the query fingerprint might match an area in a subject fingerprint that is not part of the query fingerprint. This would result in a false match.

As previously noted, entire images of neither the incoming video stream nor the known advertisements (ad intros, sponsorship messages, etc.) are stored, rather the portions of the images are captured so that the features can be calculated. Moreover, the features calculated for the portions of the images of the incoming video stream are not stored, they are calculated and compared to features for known advertisements and then discarded.

If the video stream is an analog stream and it is desired to calculate the features and compare to fingerprints in digital, then the video stream is converted to digital only as necessary. That is, if the comparisons to fingerprints are done on a image by image basis the conversion to digital will be done image by image. If the video stream is not having features generated (e.g., CCV) or being compared to at least one fingerprint then the digital conversion will not be performed. That is, if the features for the incoming video stream do not match any fingerprints so no comparison is being done or the incoming video stream was equated with an advertisement and the comparison is temporarily terminated while the ad is being displayed or a targeted ad is being substituted. If no features are being generated or compared then there is no need for the digital conversion. Limiting the amount of conversion from analog to digital for the incoming video stream means that there is less manipulation and less temporary storage (if any is required) of the analog stream while it is being converted.

When calculating the features for the incoming video stream certain sections (regions of interest) may be either avoided or focused on. Portions of an image that are excluded may be defined as regions of disinterest while regions that are focused on may be defined as regions of interest. Regions of disinterest and/or interest may include overlays, bugs, and banners. The overlays, bugs and banners may include at least some subset of channel and/or network logo, clock, sports scoreboard, timer, program information, EPG screen, promotions, weather reports, special news bulletins, close captioned data, and interactive TV buttons.

If a bug (e.g., network logo) is placed on top of a video stream (including advertisements within the stream) the calculated features (e.g., CCVs) may be incomparable to fingerprints of the same video sequence (ads or intros) that were generated without the overlays. Accordingly, the overlay may be a region of disinterest that should be excluded from calculations and comparisons.

Figure 18A:
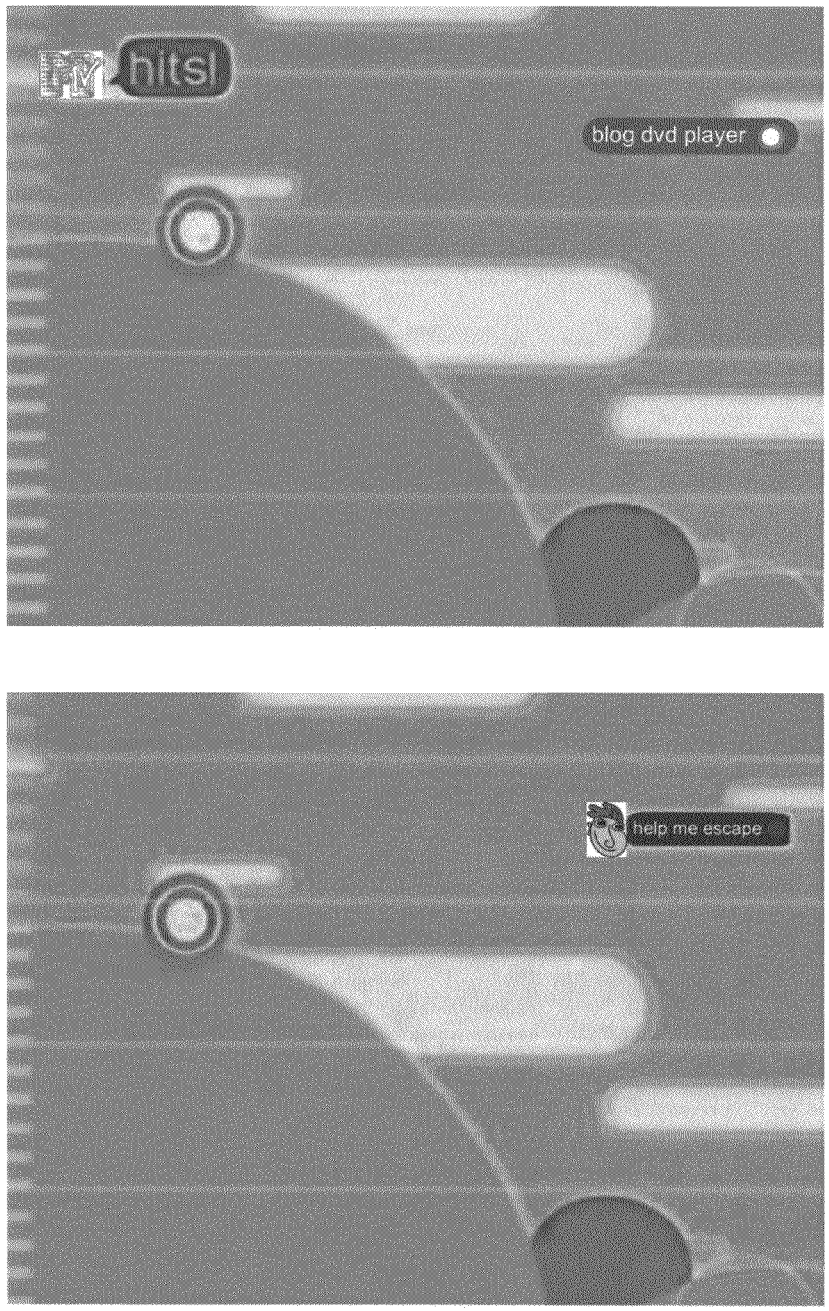
FIGS. 18A and 18B illustrate several exemplary color images with different overlays, according to one embodiment.
Figure 18B:
Figure 18B:

FIGS. 18A and 18B illustrate several exemplary color images with different overlays. In FIG. 18A the two images are taken from the same video stream. The first image has a channel logo overlay in the upper left corner and a promotion overlay in the upper right corner while the second image has no channel overlay and has a different promotion overlay. In FIG. 18B the two images are taken from the same video stream. The first image has a station overlay in the upper right corner and an interactive bottom in the lower right corner while the second image has a different channel logo in the upper right and no interactive button. Comparing fingerprints for FIG. 18A images or FIG. 18B images may result in a non-match due to the different overlays.

Figure 19A:
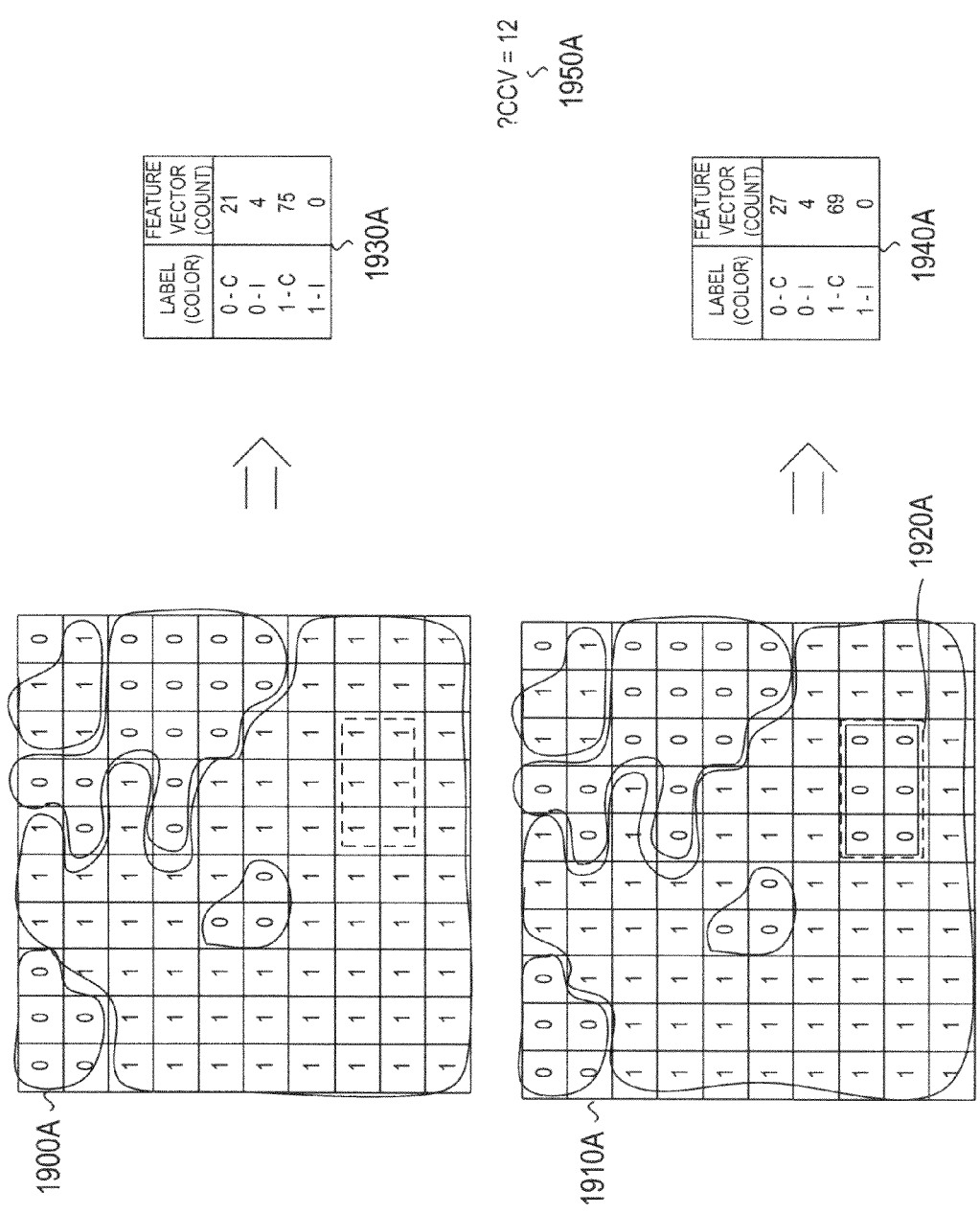
FIG. 19A illustrates an exemplary impact on pixel grids of an overlay being placed on corresponding image, according to one embodiment.

FIG. 19A illustrates an exemplary impact on pixel grids of an overlay being placed on a corresponding image. Pixel grid 1900A is for an image and pixel grid 1910A is for the image with an overlay. For ease of explanation and understanding the pixel grids are limited to 10×10 (100 pixels) and each pixel has a single bit defining each of the RGB colors. The overlay was placed in the lower right corner of the image and accordingly a lower right corner 1920A of the pixel grid 1910A was affected. Comparing the features (e.g., CCVs) 1930A, 1940A of the pixel grids 1900A, 1910A respectively indicates that the difference (distance) 1950A is 12 (using sum of absolute values).

FIG. 19A illustrates a system where the calculated fingerprint for the incoming video stream and the known advertisement fingerprints stored in a local database were calculated for entire frames. According to one embodiment, the regions of disinterest (e.g., overlays, bugs or banners) are detected in the video stream and are excluded from the calculation of the fingerprint (e.g., CCVs) for the incoming video stream. The detection of regions of disinterest in the video stream will be discussed in more detail later. Excluding the region from the fingerprint will affect the comparison of the calculated fingerprint to the known advertisement fingerprints that may not have the region excluded.

Figure 19B:
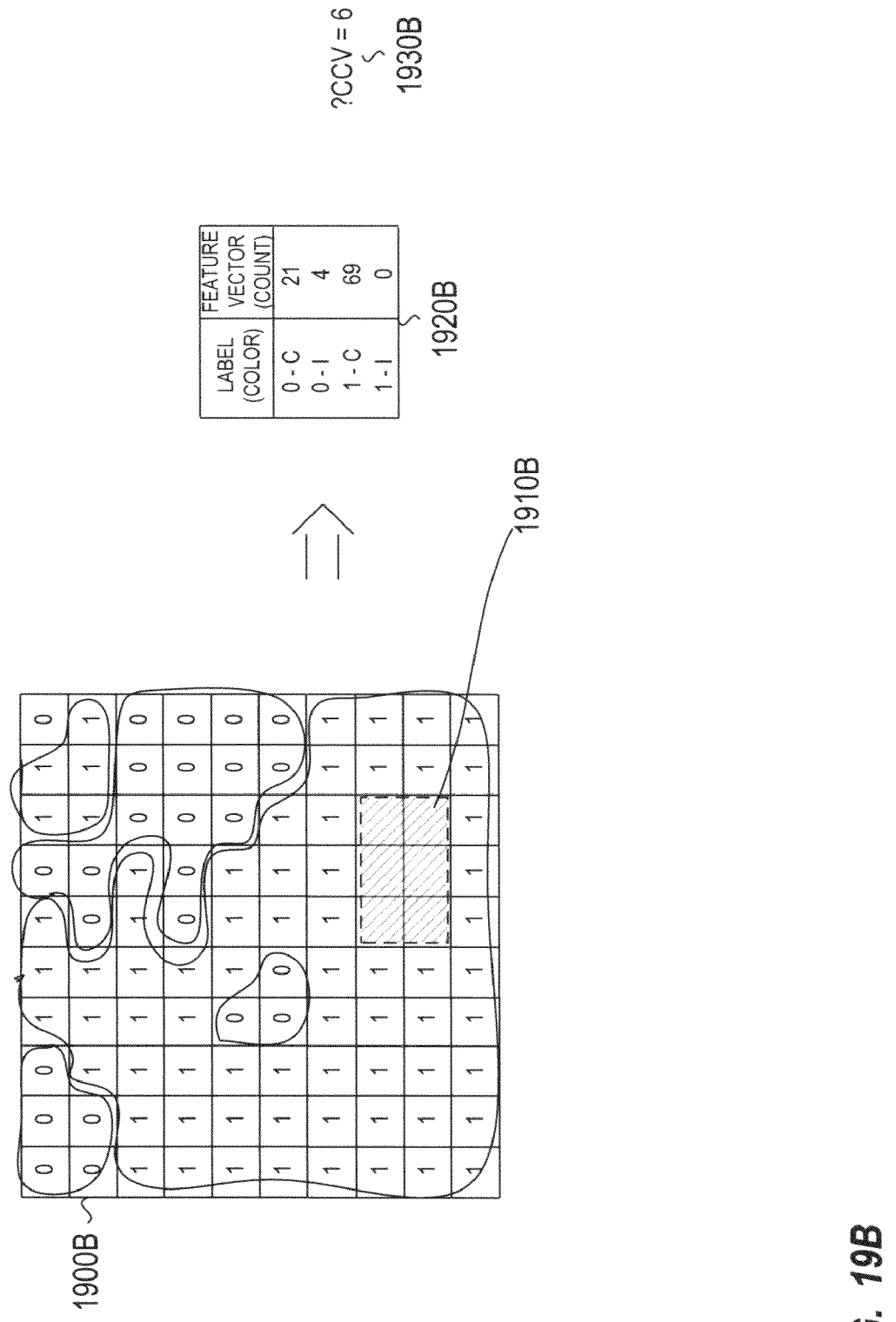
FIG. 19B illustrates an exemplary pixel grid with a region of interest excluded, according to one embodiment.

FIG. 19B illustrates an exemplary pixel grid 1900B with the region of interest 1910B (e.g., 1920A of FIG. 19A) excluded. The excluded region of interest 1910B is not used in calculating the features (e.g., CCV) of the pixel grid 1900B. As 6 pixels are in the excluded region of interest 1910B, a CCV 1920B will only identify 94 pixels. Comparing the CCV 1920B having the region of interest excluded and the CCV 1930A for the pixel grid for the image without an overlay 1900A results in a difference 1930B of 6 (using the sum of absolute values). By removing the region of interest from the difference (distance) calculation, the distance between the image with no overlay 1900A and the image with the overlay removed 1900B was half of the difference between the image with no overlay 1900A and the image with the overlay 1910A.

The regions of disinterest (ROD) may be detected by searching for certain characteristics in the video stream. The search for the characteristics may be limited to locations where overlays, bugs and banners may normally be placed (e.g., banner scrolling along bottom of image). The detection of the RODs may include comparing the image (or portions of it) to stored regions of interest. For example, network overlays may be stored and the incoming video stream may be compared to the stored overlay to determine if an overlay is part of the video stream. Comparing actual images may require extensive memory for storing the known regions of interest as well as extensive processing to compare the incoming video stream to the stored regions.

A ROD may be detected by comparing a plurality of successive images. If a group of pixels is determined to not have changed for a predetermined number of frames, scene changes or hard cuts then it may be a logo or some over type of overlay (e.g., logo, banner). Accordingly, the ROD may be excluded from comparisons.

The known RODs may have features calculated (e.g., CCVs) and these features may be stored as ROD fingerprints. Features (e.g., CCVs) may be generated for the incoming video stream and the video stream features may be compared to the ROD fingerprints. As the ROD is likely small with respect to the image the features for the incoming video stream may have to be limited to specific portions (portions where the ROD is likely to be). For example, bugs may normally be placed in a lower right hand corner so the features will be generated for a lower right portion of the incoming video and compared to the ROD fingerprints (at least the ROD fingerprints associated with bugs) to determine if an overlay is present. Banners may be placed on the lower 10% of the image so that features would be generated for the bottom 10% of an incoming video stream and compared to the ROD fingerprints (at least the ROD fingerprints for banners).

The detection of RODs may require that separate fingerprints be generated for the incoming video stream and compared to distinct fingerprints for RODs. Moreover, the features calculated for the possible RODs for the incoming video stream may not match stored ROD fingerprints because the RODs for the incoming video stream may be overlaid on top of the video stream so that the features calculated will include the video stream as well as the overlay where the known fingerprint may be generated for simply the overlay or for the overlay over a different video stream. Accordingly it may not be practical to determine RODs in an incoming video stream.

The generation of the fingerprints for known advertisements as well as for the incoming video steam may exclude portions of an image that are known to possibly contain RODs (e.g., overlays, banners). For example as previously discussed with respect to FIG. 19B, a possible ROD 1910B may be excluded from the calculation of the fingerprint for the entire frame. This would be the case for both the calculated fingerprint of the incoming video stream as well as the known advertisement fingerprints stored in the database. Accordingly, the possible ROD would be excluded from comparisons of the calculated fingerprint and the known advertisement fingerprints.

The excluded region may be identified in numerous manners. For example, the ROD may be specifically defined (e.g., exclude pixels 117-128). The portion of the image that should be included in fingerprinting may be defined (e.g., include pixels 1-116 and 129-150). The image may be broken up into a plurality of blocks (e.g., 16×16 pixel grids) and those blocks that are included or excluded may be defined (e.g., include regions 1-7 and 9-12, exclude region 6). A bit vector may be used to identify the pixels and/or blocks that should be included or excluded from the fingerprint calculation (e.g., 0101100 may indicate that blocks 2, 4 and 5 should be included and blocks 1, 3, 6 and 7 are excluded).

The RODs may also be excluded from sections and/or regions if the fingerprints are generated for portions of an image as opposed to an entire image as illustrated in FIG. 19B.

Figure 20:
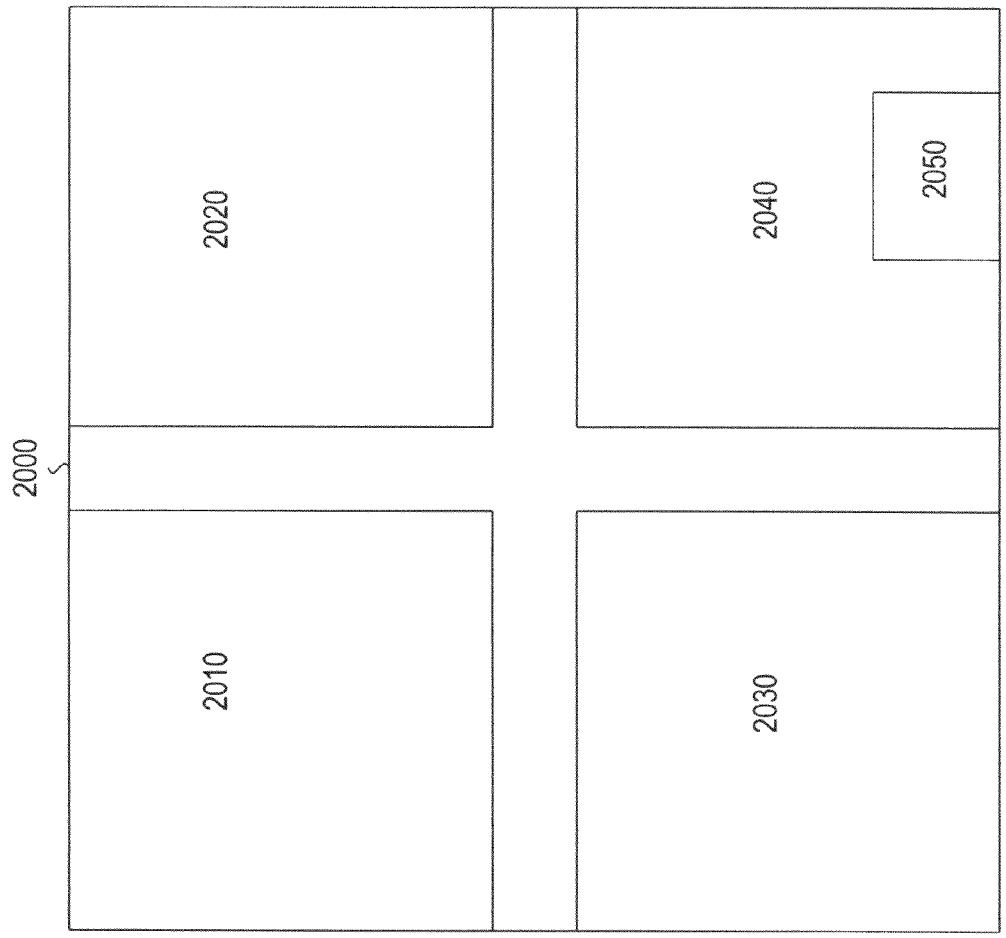
FIG. 20 illustrates an exemplary image to be fingerprinted that is divided into four sections and has a portion to be excluded from fingerprinting, according to one embodiment.

FIG. 20 illustrates an exemplary image 2000 to be fingerprinted that is divided into four sections 2010-2040. The image 2000 may be from an incoming video stream or a known advertisement, intro, outro, or channel identifier. It should be noted that the sections 2010-2040 do not make up the entire image. That is, if each of these sections is grabbed in order to create the fingerprint for the sections there is clearly no copyright issues associated therewith as the entire image is not captured and the image could not be regenerated based on the portions thereof. Each of the sections 2010-2040 is approximately 25% of the image 2000, however the section 2040 has a portion 2050 excluded therefrom as the portion 2050 may be associated with where an overlay is normally placed.

Figure 21:
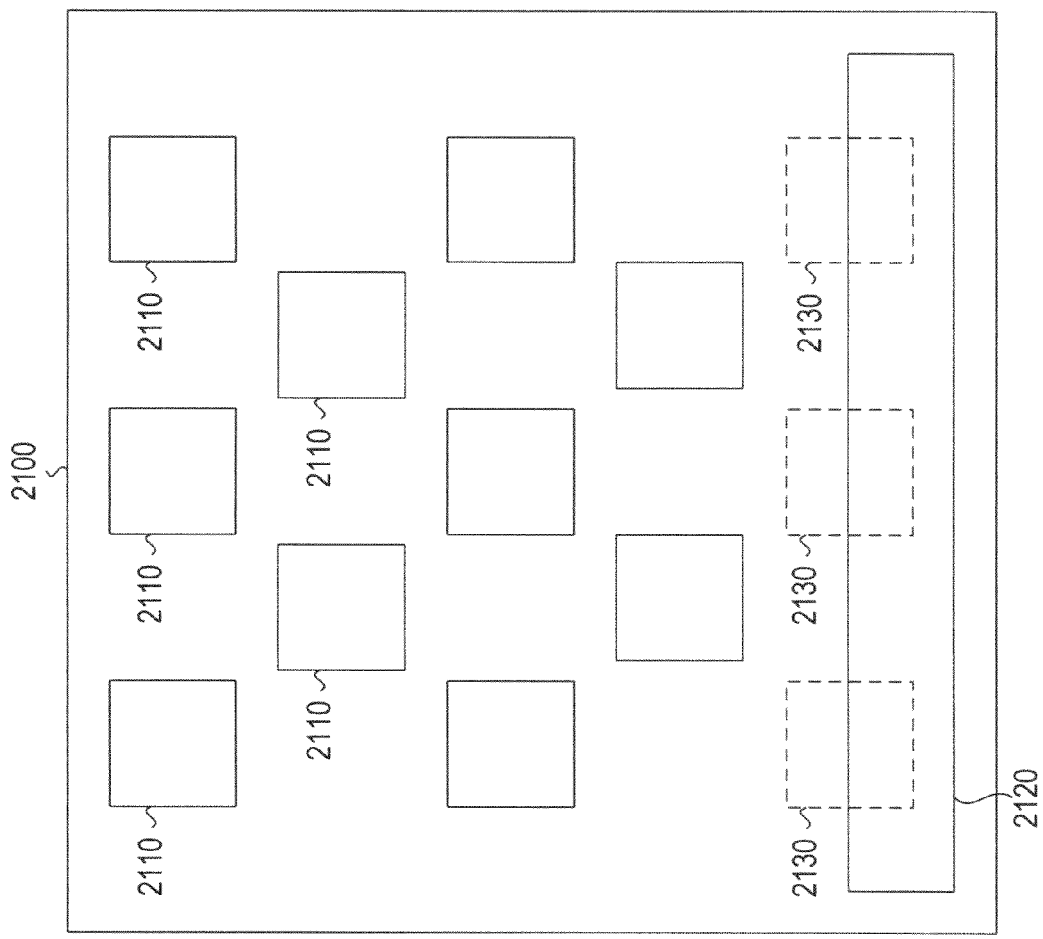
FIG. 21 illustrates an exemplary image to be fingerprinted that is divided into a plurality of regions that are evenly distributed across the image and has a portion to be excluded from fingerprinting, according to one embodiment.

FIG. 21 illustrates an exemplary image 2100 to be fingerprinted that is divided into a plurality of regions 2110 that are evenly distributed across the image 2100. Again it should be noted that the image 2100 may be from an incoming video stream or a known advertisement and that the regions 2100 do not make up the entire image. A section 2120 of the image that may be associated with where a banner may normally be placed so this portion of the image would be excluded. Certain regions 2130 fall within the section 2120 so they may be excluded from the fingerprint or those regions 2130 may be shrunk so as to not fall within the section 2120.

Ad substitution may be based on the particular channel that is being displayed. That is, a particular targeted advertisement may not be able to be displayed on a certain channel (e.g., an alcohol advertisement may not be able to be displayed on a religious programming channel). In addition, if the local ad insertion unit is to respond properly to channel specific cue tones that are centrally generated and distributed to each local site, the local unit has to know what channel is being passed through it. An advertisement detection unit may not have access to data (e.g., specific frequency, metadata) indicating identity of the channel that is being displayed. Accordingly the unit will need to detect the specific channel. Fingerprints may be defined for channel identification information that may be transmitted within the video stream (e.g., channel logos, channel banners, channel messages) and these fingerprints may be stored for comparison.

When the incoming video stream is received an attempt to identify the portion of the video stream containing the channel identification information may be made. For example, channel overlays may normally be placed in a specific location on the video stream so that portion of the video stream may be extracted and have features (e.g. CCV) generated therefore. These features will be compared to stored fingerprints for channel logos. As previously noted, one problem may be the fact that the features calculated for the region of interest for the video stream may include the actual video stream as well as the overlay. Additionally, the logos may not be placed in the same place on the video stream at all times so that defining an exact portion of the video stream to calculate features for may be difficult.

Channel changes may be detected and the channel information may be detected during the channel change. The detection of a channel change may be detected by comparing features of successive images of the incoming video stream and detecting a sudden and abrupt change in features. In digital programming a change in channel often results in the display of several monochrome (e.g., blank, black, blue) frames while the new channel is decoded.

The display of these monochrome frames may be detected in order to determine that a channel change is occurring. The display of these monochrome frames may be detected by calculating a fingerprint for the incoming video stream and comparing it to fingerprints for known channel change events (e.g., monochrome images displayed between channel changes). When channels are changed, the channel numbers may be overlaid on a portion of the video stream. Alternatively, a channel banner identifying various aspects of the channel being changed to may be displayed. The channel numbers and/or channel banner may normally be displayed in the same location. As discussed above with respect to the RODs, the locations on the images that may be associated with a channel overlay or channel banner may be excluded from the fingerprint calculation. Accordingly, the fingerprints for either the incoming video stream or the channel change fingerprint(s) stored in the database would likely be for simply a monochrome image.

Figure 22:
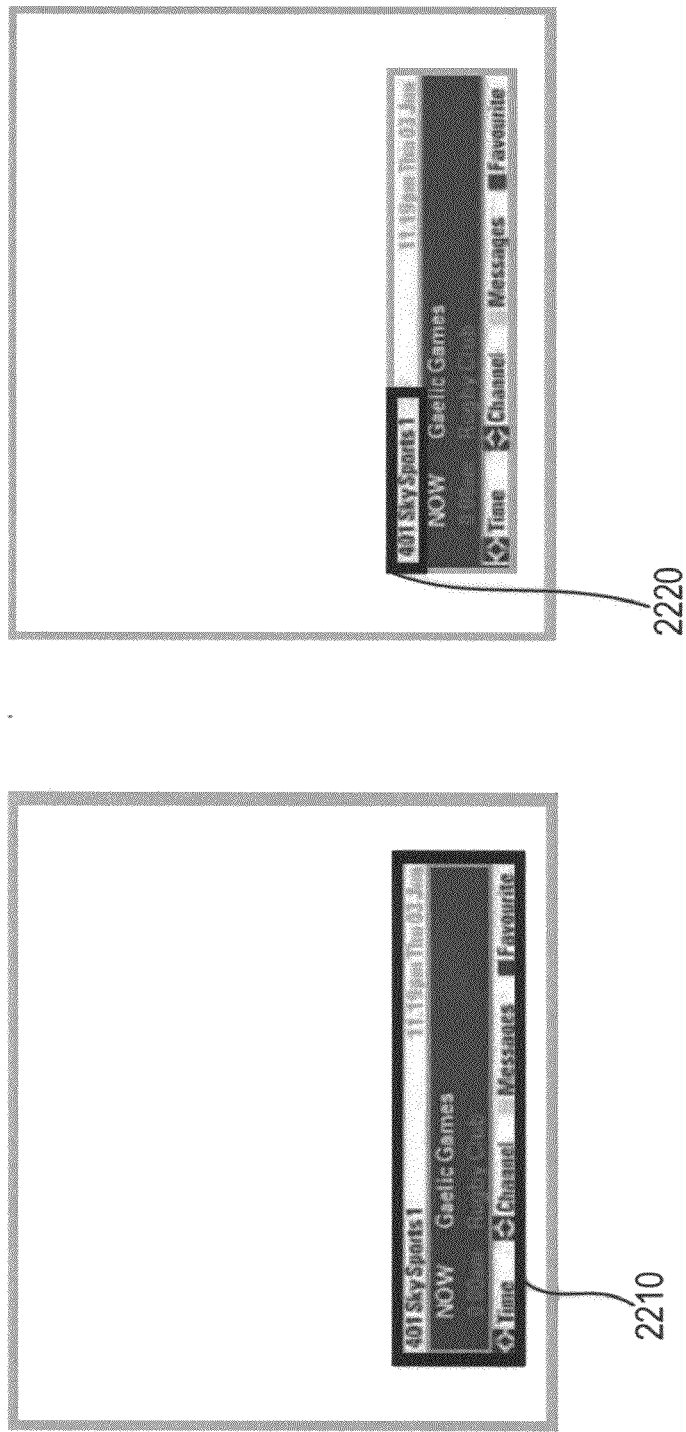
FIG. 22 illustrates exemplary channel change images, according to one embodiment.

FIG. 22 illustrates exemplary channel change images. As illustrated, the image during a channel change is a monochrome frame with the exception of the channel change banner 2210 along the bottom of the image. Accordingly, the channel banner may be identified as a region of disinterest to be excluded from comparisons of the features generated for the incoming video stream and the stored fingerprints.

After, the channel change has been detected (whether based on comparing fingerprints or some other method), a determination as to what channel the system is tuned to can be made. The determination may be based on analyzing channel numbers overlaid on the image or the channel banner. The analysis may include comparing to stored channel numbers and/or channel banners. As addressed above, the actual comparison of images or portions of images requires large amounts of storage and processing and may not be possible to perform in real time.

Alternatively, features/fingerprints may be calculated for the incoming video stream and compared to fingerprints for known channel identification data. As addressed above, calculating and comparing fingerprints for overlays may be difficult due to the background image. Accordingly, the calculation and comparison of fingerprints for channel numbers will focus on the channel banners. It should be noted that the channel banner may have more data then just the channel name or number. For example, it may include time, day, and program details (e.g., title, duration, actors, rating). The channel identification data is likely contained in the same location of the channel banner so that only that portion of the channel banner will be of interest and only that portion will be analyzed.

FIG. 22 shows that the channel identification data 2220 is in the upper left hand corner of the channel banner. Accordingly, this area may be defined as a region of interest. Fingerprints for the relevant portion of channel banners for each channel will be generated and will be stored in a database. The channel identification fingerprints may be stored in same database as the known advertisement (intro, outro, sponsorship message) fingerprints or may be stored in a separate database. If stored in the same database the channel ident fingerprints are likely segregated so that the incoming video stream is only compared to these fingerprints when a channel change has been detected.

It should be noted that different televisions and/or different set-top boxes may display an incoming video stream in slightly different fashions. This includes the channel change banners 2210 and the channel number 2220 in the channel change banner being in different locations or being scaled differently. When looking at an entire image or multiple regions of an image this difference may be negligible in the comparison. However, when generating channel identification fingerprints for an incoming video stream and comparing the calculated channel identification fingerprints to known channel identification fingerprints, the difference in display may be significant.

Figure 23:
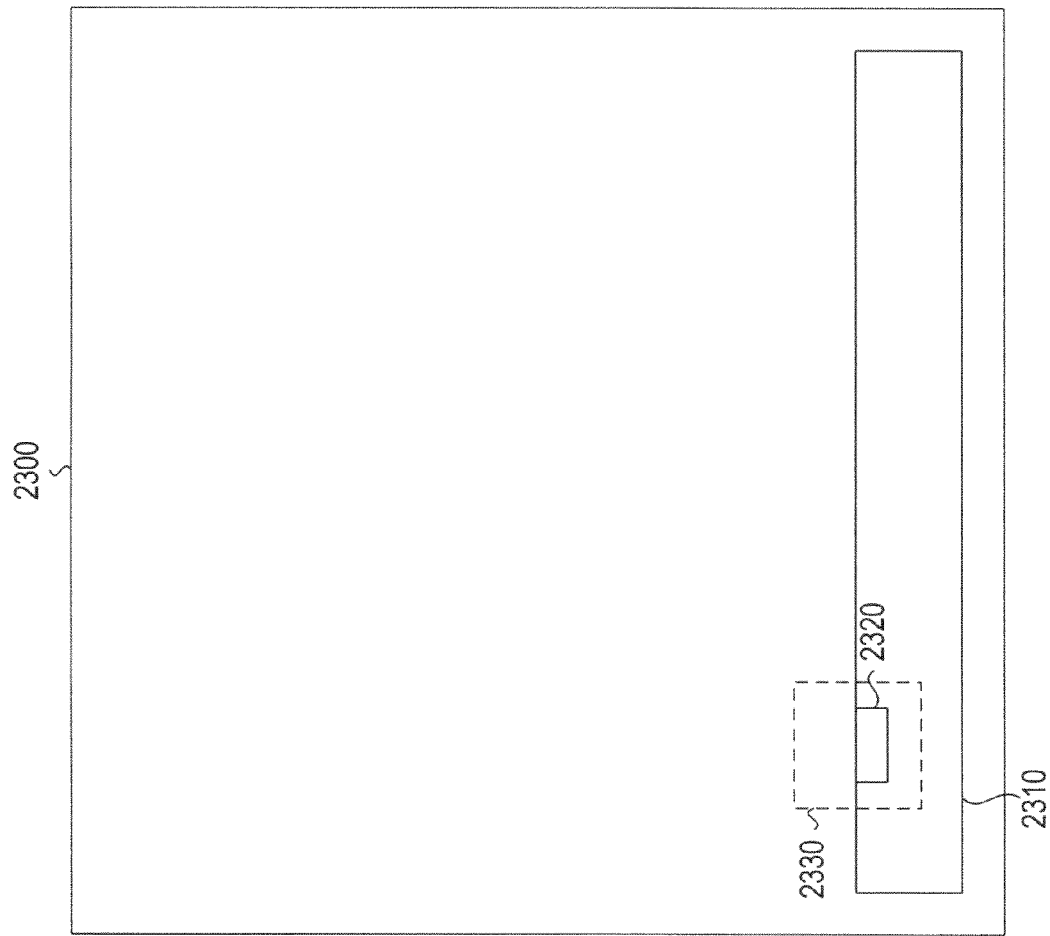
FIG. 23 illustrates an image with expected locations of a channel banner and channel identification information within the channel banner identified, according to one embodiment.

FIG. 23 illustrates an image 2300 with expected locations of a channel banner 2310 and channel identification information 2320 within the channel banner 2310 identified. The channel identification information 2320 may not be in the exact location expected due to parameters (e.g., scaling, translation) associated with the specific TV and/or STB (or DVR) used to receive and view the programming. For example, it is possible that the channel identification information 2320 could be located within a specific region 2330 that is greatly expanded from the expected location 2320.

In order to account for the possible differences, scaling and translation factors must be determined for the incoming video stream. These factors can be determined by comparing location of the channel banner for the incoming video stream to the reference channel banner 2310. Initially a determination will be made as to where an inner boundary between the monochrome background and the channel banner is. Once the inner boundary is determined, the width and length of the channel banner can be determined. The scale factor can be determined by comparing the actual dimensions to the expected dimensions. The scale factor in x direction is the actual width of the channel banner/reference width, the scale factor in y direction is the actual height of channel banner/reference height. The translation factor can be determined based on comparing a certain point of the incoming stream to the same reference point (e.g., top left corner of the inner boundary between the monochrome background and the channel banner).

The reference channel banner banners for the various channels are scaled and translated during the start-up procedure to the actual size and position. The translation and scaling parameter are stored so they are known so that they can be used to scale and translate the incoming stream so that an accurate comparison to the reference material (e.g., fingerprints) can be made. The scaling and translation factors have been discussed with respect to the channel banner and channel identification information but are in no way limited thereto. Rather, these factors can used to ensure an appropriate comparison of fingerprints of the incoming video stream to known fingerprints (e.g., ads, ad intros, ad outros, channel idents, sponsorships). These factors can also be used to ensure that regions of disinterest or regions of interest are adequately identified.

Alternatively, rather then creating a fingerprint for the channel identifier region of interest the region of interest can be analyzed by a text recognition system that may recognize the text associated with the channel identification data in order to determine the associated channel.

Some networks may send messages ('channel ident') identifying the network (or channel) that is being displayed to reinforce network (channel) branding. According to one embodiment, these messages are detected and analyzed to determine the channel. The analysis may be comparing the message to stored messages for known networks (channels). Alternatively, the analysis may be calculating features for the message and comparing to stored features for known network (channel) messages/idents. The features may be generated for an entire video stream (entire image) or may be generated for a portion containing the branding message. Alternatively, the analysis may include using text recognition to determine what the message says and identifying the channel based on that.

A maximum break duration can be identified and is the maximum amount of time that the incoming video stream will be preempted. After this period of time is up, insertion of advertisements will end and return to the incoming video stream. In addition a pre-outro time is identified. A pre-outro is a still or animation that is presented until the max break duration is achieved or an outro is detected whichever is sooner. For example, the maximum break duration may be defined as 1:45 and the pre-outro may be defined as :15. Accordingly, three 30 second advertisements may be displayed during the first 1:30 of the ad break and then the pre-outro may be displayed for the remaining :15 or until an outro is detected, whichever is sooner. The maximum break duration and outro time are defined so as to attempt to prevent targeted advertisements from being presented during programming. If an outro is detected while advertisements are still being inserted (e.g., before the pre-outro begins) a return to the incoming video stream may be initiated. As previously discussed sponsorship messages may be utilized along with or in place of outros prior to return of programming. Detection of a sponsorship message will also cause the return to the incoming video stream. Detection of programming may also cause the return to programming.

A minimum time between detection of a video entity (e.g., ad, ad intro) that starts advertisement insertion and ability to detect a video entity (e.g., ad outro, programming) that causes ad insertion to end can be defined (minimum break duration). The minimum break duration may be beneficial where intros and outros are the same. The minimum break duration may be associated with a shortest advertisement period (e.g., 30 seconds). The minimum break duration would prevent the system from detecting an intro twice in a relatively short time frame and assuming that the detection of the second was an outro and accordingly ending insertion of an advertisement almost instantly.

A minimum duration between breaks (insertions) may be defined, and may be beneficial where intros and outros are the same. The duration would come into play when the maximum break duration was reached and the display of the incoming video steam was reestablished before detection of the outro. If the outro was detected when the incoming video stream was being displayed it may be associated with an intro and attempt to start another insertion. The minimum duration between breaks may also be useful where video entities similar to know intros and/or outros are used during programming but are not followed by ad breaks. Such a condition may occur during replays of specific events during a sporting event, or possibly during the beginning or ending of a program, when titles and/or credits are being displayed.

The titles at the beginning of a program may contain sub-sequences or images that are similar to know intros and/or outros. In order to prevent the detection of these sub-sequences or images from initiating an ad break, the detection of programming can be used to suppress any detection for a predefined time frame (minimum duration after program start). The minimum duration after program start ensures that once the start of a program is detected that sub-sequences or images that are similar to know intros and/or outros will not interrupt programming.

The detection of the beginning of programming (either the actual beginning of the program or the return of programming after an advertisement break) may end the insertion of targeted advertisements or the pre-outro if the beginning of programming is identified before the maximum break duration is expired or an outro is identified.

Alternatively, if an outro, sponsorship message or programming is detected during an advertisement being inserted, the advertisement may be completed and then a return to programming may be initiated.

The detection of the beginning of programming may be detected by comparing a calculated fingerprint of the incoming video stream with previously generated fingerprints for the programming. The fingerprints for programming may be for the scenes that are displayed during the theme song, or a particular image that is displayed once programming is about to resume (e.g., an image with the name of the program). The fingerprints of programming and scenes within programming will be defined in more detail below.

Once it is determined that programming is again being presented on the incoming video stream the generation and comparison of fingerprints may be halted temporarily as it is unlikely that an advertisement break be presented in a short time frame.

The detection of a channel change or an electronic program guide (EPG) activation may cause the insertion of advertisements to cease and the new program or EPG to be displayed.

Fingerprints can be generated for special bulletins that may preempt advertising in the incoming video stream and correspondingly would want to preempt insertion of targeted advertising. Special bulletins may begin with a standard image such as the station name and logo and the words special bulletin or similar type slogan. Fingerprints would be generated for each known special bulletin (one or more for each network) and stored locally. If the calculated fingerprint for an incoming video stream matched the special bulletin while targeted advertisement or the pre-outro was being displayed, a return to the incoming video stream would be initiated.

The specification has concentrated on local detection of advertisements or advertisement intros and local insertion of targeted advertisements. However, the specification is not limited thereto. For example, certain programs may be detected locally. The local detection of programs may enable the automatic recording of the program on a digital recording device such as a DVR. Likewise, specific scenes or scene changes may be detected. Based on the detection of scenes a program being recorded can be bookmarked for future viewing ease.

To detect a particular program, fingerprints may be established for a plurality of programs (e.g., video that plays weekly during theme song, program title displayed in the video stream) and calculated features for the incoming video stream may be compared to these fingerprints. When a match is detected the incoming video stream is associated with that program. Once the association is made, a determination can be made as to whether this is a program of interest to the user. If the detected program is a program of interest, a recording device may be turned on to record the program. The use of fingerprints to detect the programs and ensure they are recorded without any user interaction is an alternative to using the electronic or interactive program guide to schedule recordings. The recorded programs could be archived and indexed based on any number of parameters (e.g., program, genre, actor, channel, network).

Scene changes can be detected as described above through the matching of fingerprints. If during recording of a program scene changes are detected, the change in scenes can be bookmarked for ease of viewing at a later time. If specific scenes have already been identified and fingerprints stored for those scenes, fingerprints could be generated for the incoming video stream and compared against scene fingerprints. When a match is found the scene title could bookmark the scene being recorded.

The fingerprints stored locally may be updated as new fingerprints are generated for any combination of ads, ad intros, channel banners, program overlays, programs, and scenes. The updates may be downloaded automatically at certain times (e.g., every night between 1 and 2 am), or may require a user to download fingerprints from a certain location (e.g., website) or any other means of updating. Automated distribution of fingerprints can also be utilized to ensure that viewers local fingerprint libraries are up-to-date.

The local detection system may track the features it generates for the incoming streams and if there is no match to a stored fingerprint, the system may determine that it is a new fingerprint and may store the fingerprint. For example, if the system detects that an advertisement break has started and generates a fingerprint for the ad (e.g., new Pepsi® ad) and the features generated for the new ad are not already stored, the calculated features may be stored for the new ad.

In order to ensure that video segments (and in particular intros and advertisements) are detected reliably, regions of interest in the video programming are marked and regions outside of the regions of interest are excluded from processing. The marking of the regions of interest is also used to focus processing on the areas that can provide information that is useful in determining to which channel the unit is tuned. In one instance, the region of interest for detection of video segments is the region that is excluded for channel detection and visa versa. In this instance the area that provides graphics, icons or text indicating the channel is examined for channel recognition but excluded for video segment recognition.

Figure 24:
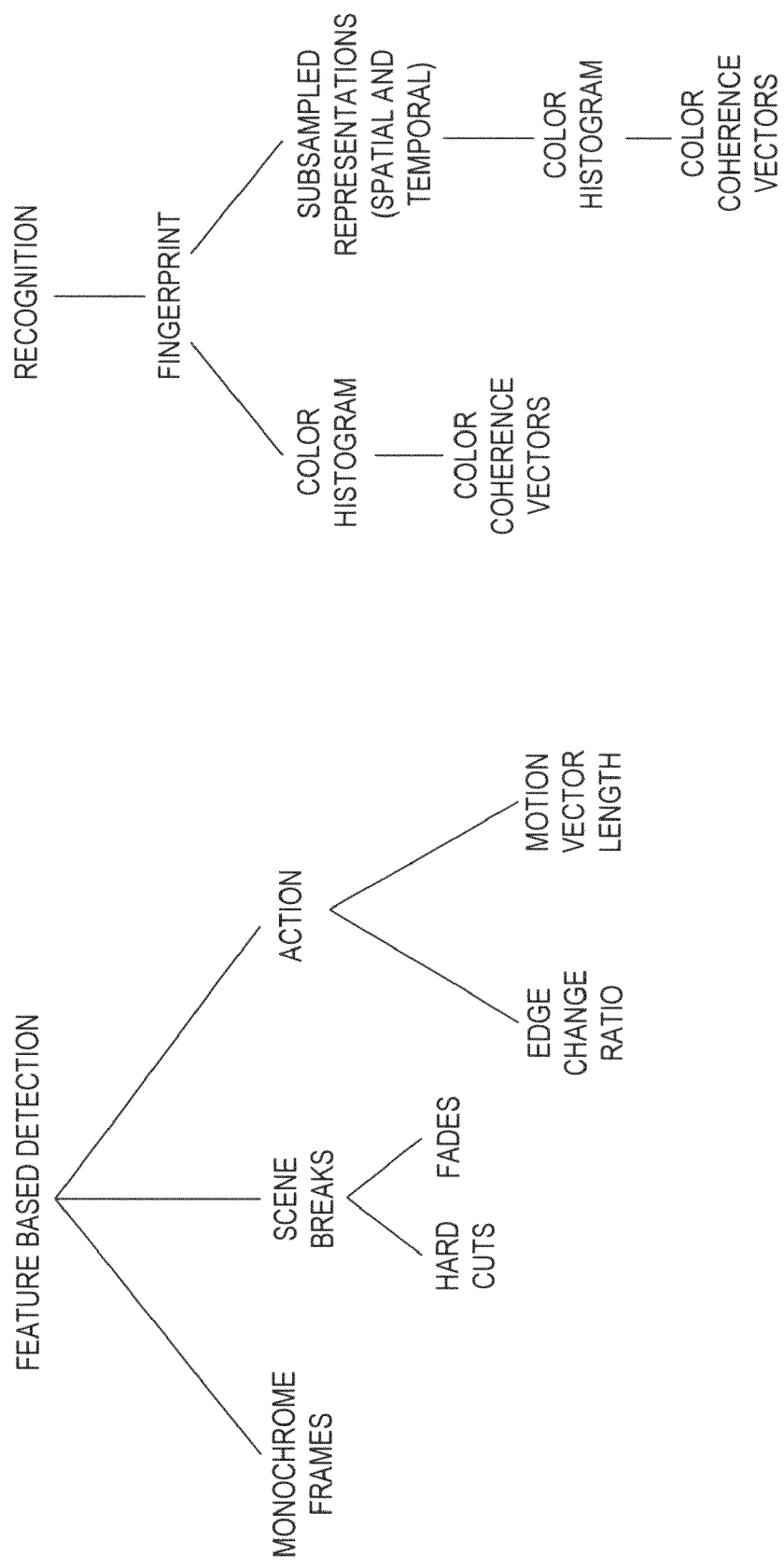
FIG. 24 illustrates the family of feature based detection methods as well as recognition and specifically fingerprint detection methods.

FIG. 24 illustrates both the feature based detection and recognition based detection methods that can be applied to video streams to recognize video entities. Video entities can be considered to be either known segments or sections of video which are of interest for automatic detection. For example, advertisements, intros to sets of advertisements, promotions, still images representing advertisements, and other types of inserted advertising materials are video entities. Scene breaks including scene breaks leading to advertisements or scene breaks simply placed between scenes of the programming can also be considered to be video entities. As such video entities represent portions of the video stream that content providers may desire to keep integral to the video stream but which automatic detection equipment may be able to recognize for alteration of the video stream contrary to the wishes of the content provider.

Referring to the left side of FIG. 24 the figure illustrates the feature based detection methods including the detection of monochrome frames, the detection of scene break either through hard cuts or fades or the detection of action either through measurement of edge change ratios or motion vector lengths.

The right side of FIG. 24 illustrates the type of recognition methods that can be used based on fingerprints. Fingerprints can be created using both color histograms or CCVs based on the entire image or can be generated based on subsampled representations where the subsampling occurs either spatially or temporally. Although FIG. 24 illustrates the use of color histograms and CCVs, a number of other statistical parameters associated with the images or portions thereof can be used to create fingerprints.

The following portion of the specification discusses mechanisms for inhibiting the detection of video segments/entities, and in particular for inhibiting the detection of advertisements. As will be appreciated by one skilled in the art, modifications to a video stream to inhibit the detection of video segments/entities can be based on modification of features of the stream (the features being illustrated on the left side of FIG. 24) or on modification of parameters used for the recognition of video segments/entities, such at the fingerprint parameters illustrated on right side of FIG. 24.

Figure 25A:
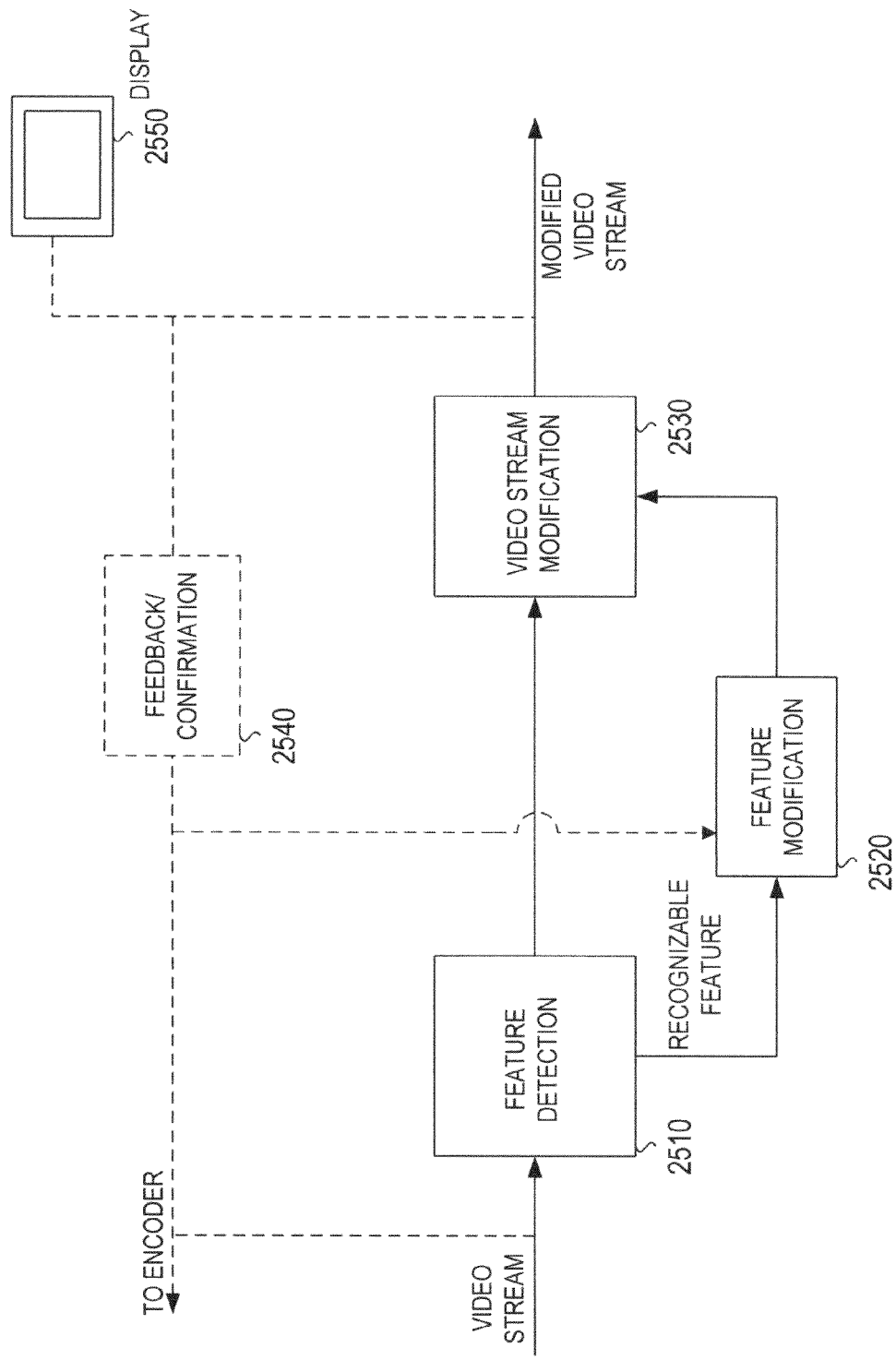
FIGS. 25A, 25B and 25C illustrate systems for feature detection and modification to defeat video entity recognition
Figure 25B:
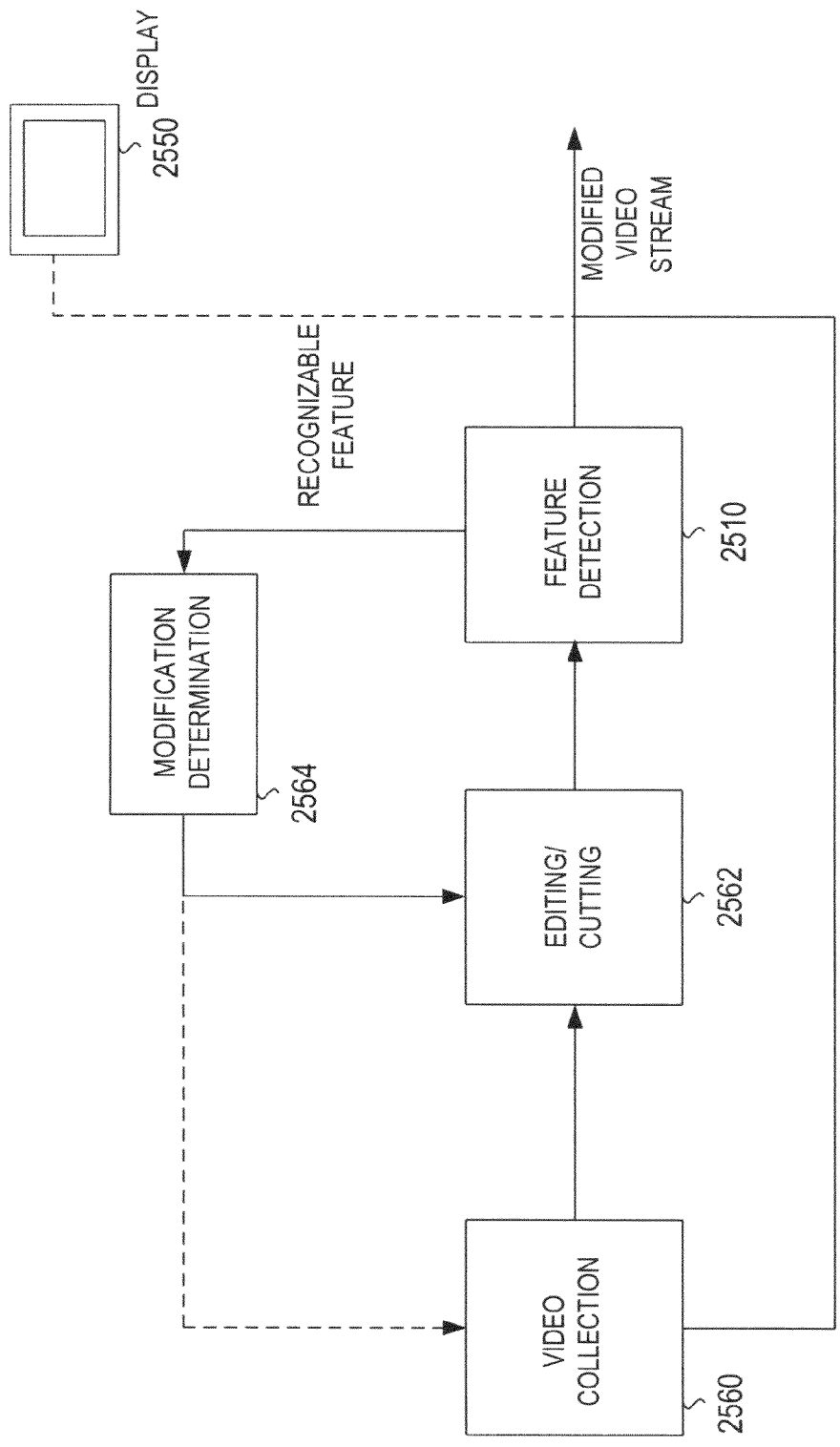

FIGS. 25A-B illustrate feature detection and video stream modification systems that modify live and stored video respectively, creating modified video streams that are immune to detection.

FIG. 25A illustrates a feature detection and video stream modification system in which a video stream enters a feature detection unit 2510 which produces recognizable features which are fed to a feature modification unit 2520. The function of feature modification unit 2520 is to alter the recognizable features such that automatic detection of those features is no longer possible. For example, feature modification unit 2520 may insert one or more monochrome frames in addition to the existing monochrome frames such that false detection of a video entity occurs or conversely may eliminate all monochrome frames so that no video entity detection can take place based on the presence or absence of monochrome frames. Scene breaks can be modified such that false fades are generated from hard cuts or that fades are turned into hard cuts. For example, upon detection of a hard cut additional I frames or combination of I frames P frames and B frames can be generated with artificial fades. With respect to fades, the fading within the video stream can be eliminated to turn a fade into something that is more akin to a hard cut. By modifying the scene breaks in feature modification unit 2520 it is possible to create a modified video stream on which signal processing algorithms for the detection of video entities based on monochrome frames, scene breaks or action no longer function, or function with such poor accuracy that they can no longer be used because they delete parts of the program that should not be deleted or falsely recognize video entities for bookmarking or other applications.

In an alternate embodiment intro/outro breaks are inserted into the video programming stream without showing any advertisement after the intro or before the outro. In order to increase the effectiveness of this technique for defeating advertisement detection the intro/outros may be scattered randomly throughout the programming.

Another method for defeating the detection of advertisements through the modification of features is to alter the programming around the advertisements causing, for example, changes in the average cut frequency, motion level, scene breaks, that are consistent with the features present in the advertisement break. This causes the programming to have features which are similar to the features of the advertisement breaks to prevent detection of the ads. In one embodiment the programming is edited to match the average feature values of the advertisement break.

In one embodiment the feature distributions that are made more similar to advertisement breaks are the distributions including cut frequency (or shot duration), monochrome frame frequency and duration, amount of action content (e.g.

an increase in video segments having low motion by artificial camera motion), changes to audio level, and insertion of black bars.

Changes in the feature value distribution can be achieved through changes in the camera position including increasing the number of pseudo zooms and creating any including split screens, pseudo zooms, pans and color changes which cause of the features of the programming to more closely match those of the advertisements.

In an alternate embodiment, alterations to the video stream include the insertion of elements including subareas or full video clips which usually occur only during an ad break. In one embodiment intros/outros/station advertisements are inserted into the programming to cause various segments of the programming to be more similar to the advertisement breaks.

In one embodiment the advertisements themselves are modified to make feature based recognition of the advertisements difficult. As an example, presentation of the advertisements may be modified including presentation of the advertisements at less than full screen. By presenting the advertisements in less than full screen mode, such as display of the advertisement in a sub-window or small window of the screen, the feature values will be modified significantly. Alternatively, or in addition to the previously described feature modifications, monochrome or black frames can be removed. Black or monochrome frames may also be inserted randomly in the advertisements or sets of advertisements causing feature based detection to fail through triggering on false monochrome frames. The resulting features of the modified advertisements and composite advertisement break can be made to be significantly different than those present in a typical advertisement or advertisement break, causing feature based detection to fail.

Video stream modification unit 2530 in FIG. 25 then combines the modified features developed in feature modification unit 2520 with the existing video stream to create a final modified video stream.

The modified video stream can be displayed on display 2550 and in one embodiment an optional feedback/confirmation unit 2540 is incorporated for the purpose of either causing additional modification to the video stream based on the observation on display 2550 or for feedback into a video encoding system. For feedback into a video encoding system feedback confirmation unit 2540 can serve the role of altering the compression algorithms and causing spatial and chromatic frame modifications such that the recognizable features are altered prior to the creation of the video stream. As such the video stream that is created with feedback based on the modifications is considered to be a modified video stream.

Additionally, feedback can be provided to feature modification unit 2540 to alter the types of modifications in the event that they cause inappropriate changes to the video, or are insufficient to mask the features in the video stream. In one embodiment, feedback confirmation unit 2540 performs feature detection similar to what would be performed in an external feature detection system or by feature detection unit 2520 and, based on the number of features detected, causes further changes in the video stream at the encoder or in feature modification unit 2520.

Display 2550 in FIG. 25A can be used to monitor the quality of the video such that if the modification to the video causes a perceivable decrease in quality the feature modification unit 2520 can be altered or feedback/confirmation unit 2540 can feedback information in the video stream which causes the video to be returned to an acceptable quality.

FIG. 25B illustrates a system for the modification of stored video in which a video collection system 2560 provides video to a editing/cutting unit 2562 which forwards a prepared video stream to feature detection unit 2510. Feature detection unit 2510 determines recognizable features which are processed by a modification determination unit 2564 that determines what types of modifications should be made in either the editing/cutting of the video stream in editing/cutting unit 2562 or in the video collection system 2560. As will be understood by one skilled in the art, several iterations may be required to reduce (or increase, in the event a "false alarm" or false positive approach is desired) the number of recognizable features to an acceptable level. As such, the modified video stream can be stored in video collection system 2560. A display 2550 can also be present to monitor the modified video stream.

The types of modifications than can be employed in editing/cutting unit 2562 include, but are not limited to, temporal, spatial, and chromatic modifications or combinations thereof. The appropriate modifications to defeat feature based detection are determined by feature detection unit 2510. Temporal modifications can include time compression or extension of the video, while spatial modifications can include stretching, warping, rotation about an axis, or other types of image processing, rendering, or editing that will result in detectable spatial modifications of the video stream.

Figure 25C:
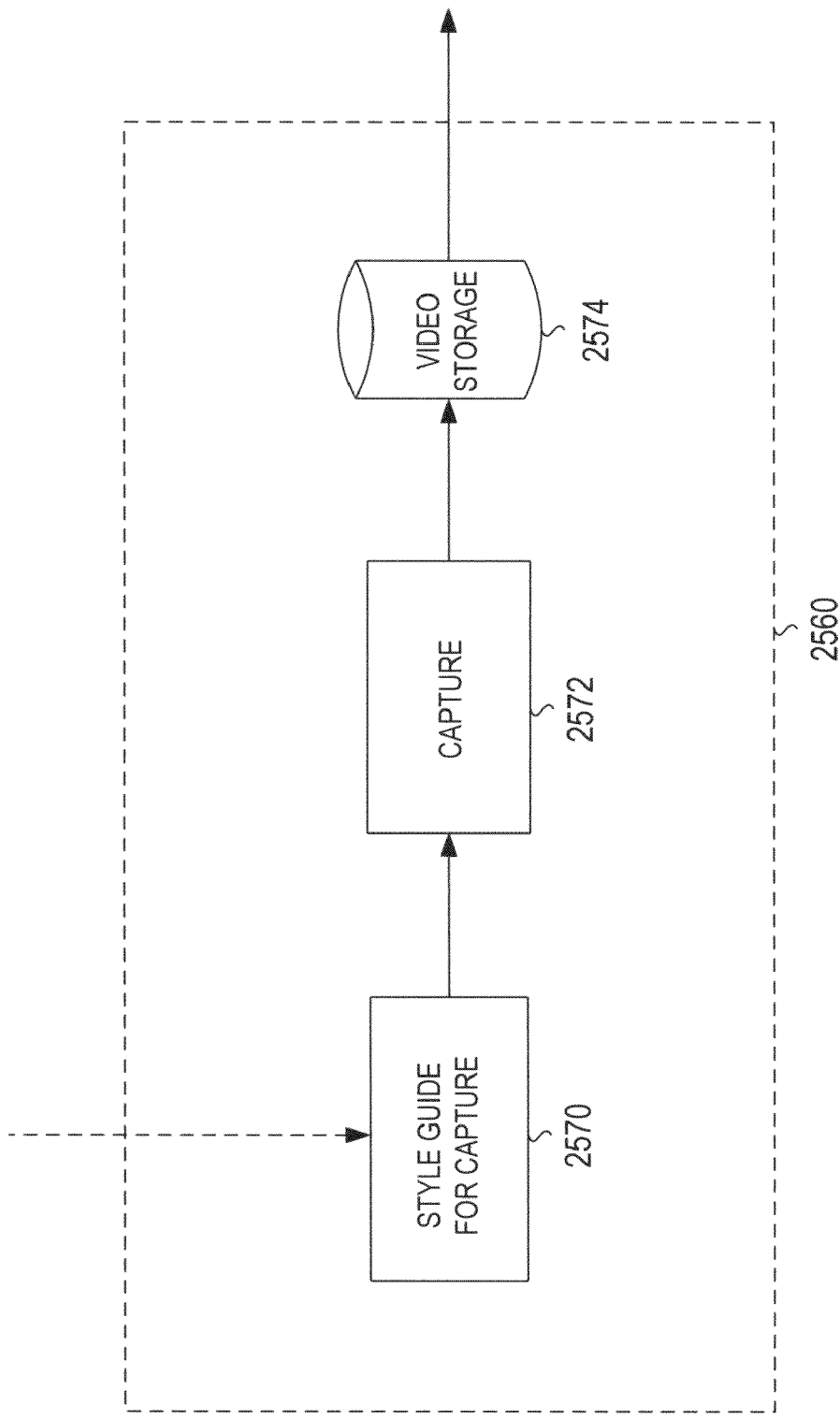

FIG. 25C further illustrates video collection system 2560, which can be comprised of a style guide for capture 2570, a capture unit 2572, and a video footage storage unit 2574. Feedback from modification/determination unit 2564 can be used to alter the style guide for capture 2570 and can indicate how many zooms/pans to perform, and what types of backgrounds and action/movement are required. The style guide provides an indication as to how the video should be edited or produced to create a video stream for presentation. In one embodiment the style guide for capture 2570 is modified to create more "ad-like" features thus increasing, rather than decreasing, the number of recognizable features. In this embodiment the number of false ad breaks detected by an advertisement detection system will be so high that automated ad detection will not be possible. In another embodiment the video stream is modified to reduce recognizable features by altering the capture process and/or editing/cutting process to create video footage with minimized recognizable features.

Figure 26:
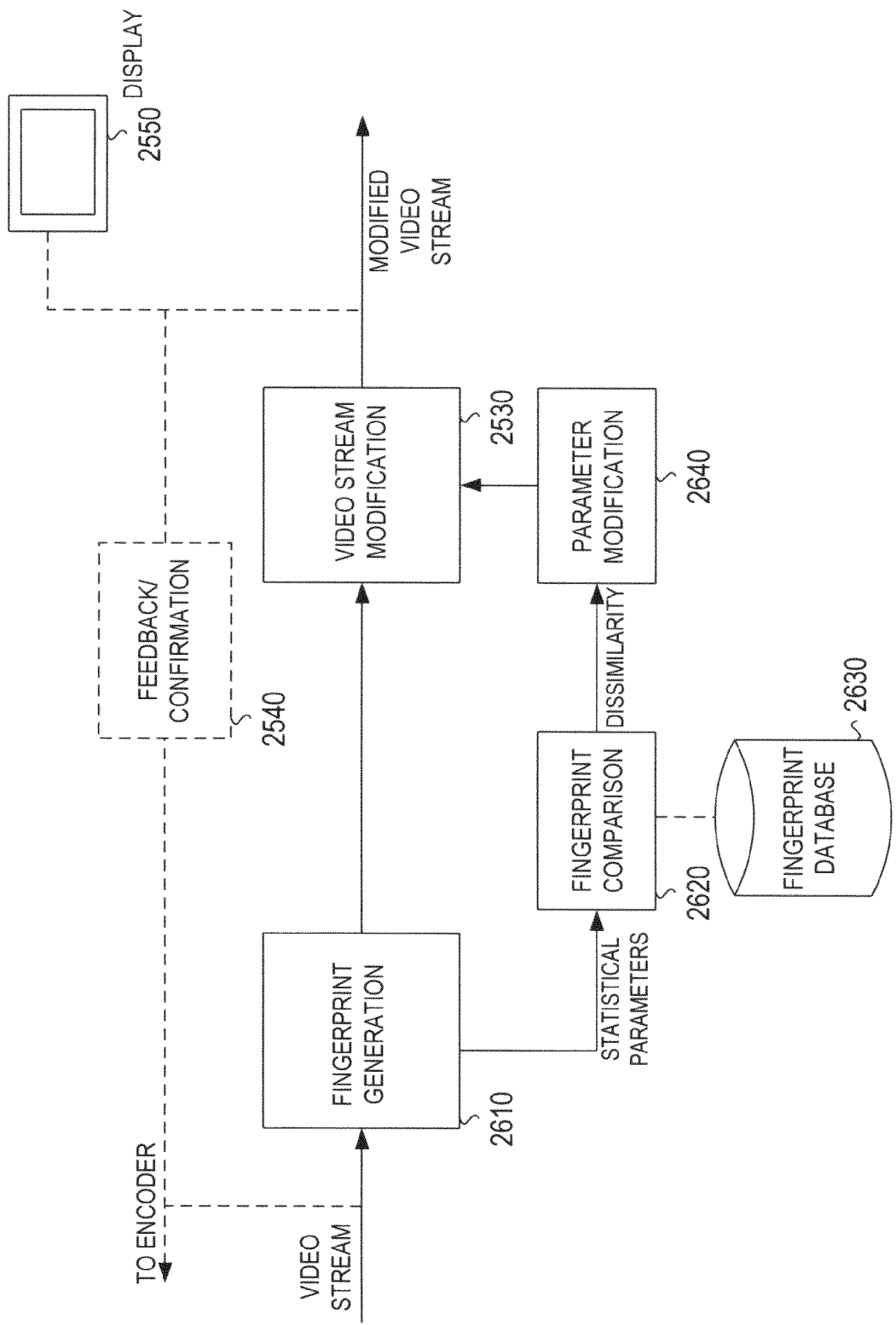
FIG. 26 illustrates a system for fingerprint generation comparison and video stream modification to defeat video entity recognition FIGS. 27A and B illustrate methods of altering color histograms and color coherence vectors as well as shifting regions of interest/disinterest.

FIG. 26 illustrates a recognition based system for the modification of video to inhibit or disable video segment/entity recognition. As can be seen in FIG. 26 a video stream enters a fingerprint generation unit 2610 which produces statistical parameters corresponding to fingerprints from the video stream. The statistical parameters are sent to a fingerprint comparison unit 2620 which performs a comparison of the fingerprints of the video entities in the video stream against a fingerprint database 2630. Based on this comparison a measure of dissimilarity is produced as has been previously described. This measure of dissimilarity may be based on mean square difference, absolute differences or other geometrical or arithmetic measures of dissimilarity. The measure of dissimilarity is passed to a parameter modification unit 2640 which causes modification of the video stream in the video modification unit 2530. The resulting modified video can be optionally passed to display 2550 or to a feedback/confirmation unit 2540 which allows for feedback of information related either to the quality or the need for additional modification to the video stream prior to encoding.

The system illustrated in FIG. 26 can thus be used to receive a video stream and compare video entities in that stream corresponding to segments of images, complete frames, sets of frames or sub-sampled regions against the fingerprint database 2630. The system thus makes the appropriate modifications to the video stream and causes the failure of the fingerprint comparison engine to match the video entities in the video stream with known fingerprints in the fingerprint database. Alternatively the modification may be such that they cause matches to multiple fingerprints in the database thus rendering the automatic detection of video entities useless because of the high number of false positives.

In an alternate embodiment no comparison is performed between the fingerprints corresponding to the video entities in the video stream and the database but the parameter modification is simply performed based on the modification of parameters known to affect fingerprint recognition. In this embodiment, fingerprint comparison unit 2620 and fingerprint database 2630 are not required and parameters such as color or regions of color are modified to cause fingerprint recognition that will be performed on another piece of equipment to be either disabled or made unreliable.

In one embodiment, the video entities to be modified are indicated through a manual operation in which the operator indicates video entities (advertisement, scene changes or other material that the content provider does not want deleted) and through the manual indication the system causes a parameter modification sufficient to defeat fingerprinting.

In an alternative embodiment, the statistical parameters are randomly modified but with a frequency sufficient to cause alteration of the statistical parameters of advertisements and other video entities of interest to the content provider. In this embodiment the modification can take place at a rate sufficient to ensure that the statistical parameters of the video stream are frequently modified and that through this frequent modification a subsequent fingerprint recognition system will fail. For example, modification to the statistical parameters can occur every few milliseconds ensuring that fingerprints created from the video stream will not accurately match fingerprints in a database.

A number of techniques can be utilized to cause recognition based systems to fail including the generation of large sets of visually similar intros/outros and advertisements which are, on a frame-by-frame basis, significantly different. In one embodiment fingerprints from these various similar intros, outros, and advertisements will be different enough from the fingerprints in fingerprint database 2630 and will not be improperly recognized. Additionally, generation of large sets of similar intros/outros, and advertisements can cause fingerprint database 2630 to become overloaded and can render it ineffective.

In an alternate embodiment intros/outros and advertisements are scaled, shifted or cropped randomly to cause changes not only in the features but in the fingerprints dust rendering fingerprint based detection ineffective.

As previously discussed, the modified video steam may be monitored on display 2550 or through an automated monitoring means to ensure that the parameter modification has not altered the video stream to the point which it will not be acceptable to a user. Because the statistical parameters can be modified within small sub-regions of an image or across an entire image for a single frame it is possible to constantly modify the video stream to substantially alter the statistical parameters and increase the dissimilarity of video entities with previous created video entities without substantially degrading the picture.

In one embodiment I frames within a compressed digital video stream are modified randomly but are not modified to the extent that they cause subsequent decoding to fail or cause noticeable alterations in the image as perceived by the viewer. In yet another embodiment P frames or B frames are modified such that the statistical parameters from those frames could not be used to generate a fingerprint which will match video entities for which fingerprints have been previously developed.

Figure 27A:
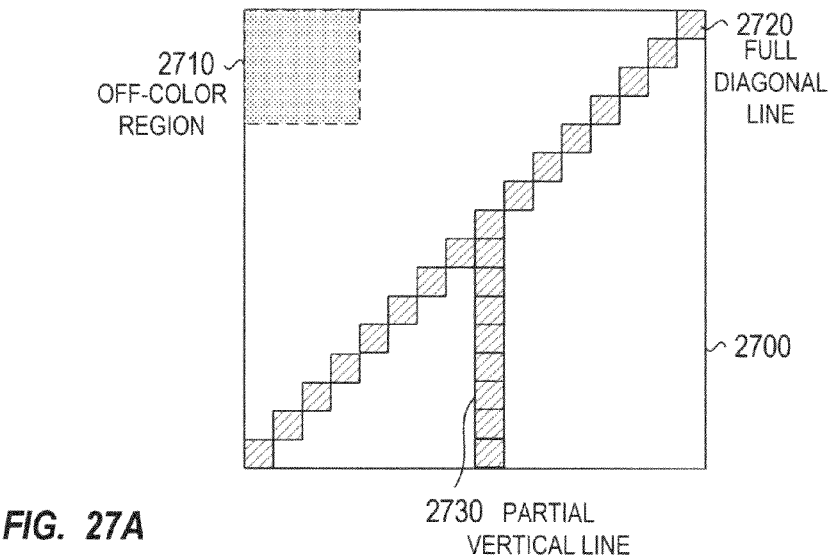

FIG. 27A illustrates the modification of an image 2700 through the creation of an off color region 2710, insertion of a full diagonal line 2720 or insertion of a partial vertical line 2730. As will be appreciated by one skilled in the art, the alterations to the image illustrated in FIG. 27A will cause alterations in the statistical parameters and in particular to the CCVs and color histograms associated with image 2700. In particular the full diagonal line 2720 will create a break in any color regions between the area above the diagonal line and below the diagonal line and will cause changes in the CCV. Similarly, the partial vertical line 2730 will interrupt color regions to the left and to the right of the vertical line. By using combinations of lines in the image it is possible to significantly alter the CCV associated with that image. Although FIG. 27A illustrates the application of these techniques to an entire image the sub-sampled regions either spatially or temporally can be altered through the technique illustrated in FIG. 27A. A number of other methods can be used to alter these statistical features including slight modifications to motion vectors altering the general color of one or more frames of the video stream or moving off color regions throughout one or more images.

Figure 27B:
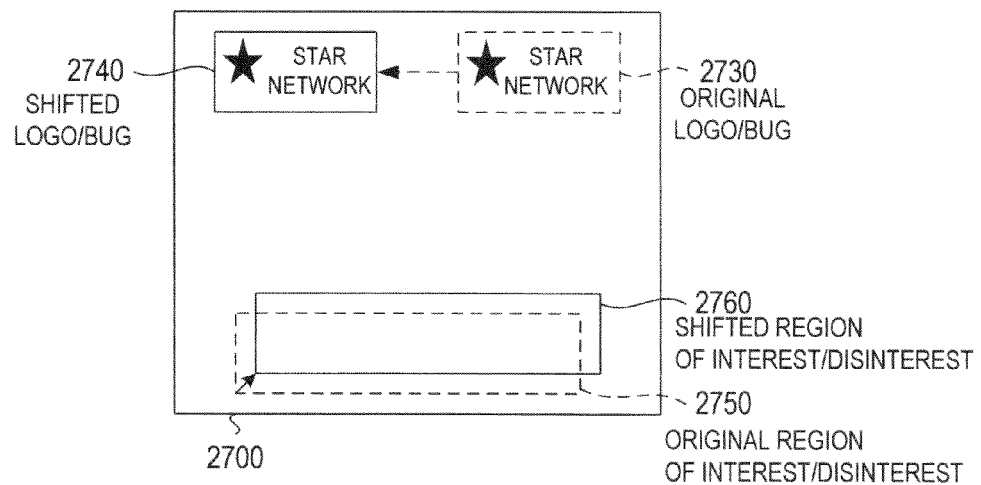

FIG. 27B illustrates the use of shifted areas on image 2700 to cause an increase in the dissimilarity between the video entity in the video stream and the known video entities that have been stored on a database. Referring again to FIG. 27B an original logo/bug 2730 can be moved from one area of the screen to another area of the screen at which it appears as a shifted logo/bug 2740. Although this causes no consternation to the viewer, if the video entity detection system is based on the recognition of a logo or the exclusion of the logo from a fingerprint, the movement of that logo can cause failure of the video entity recognition system.

Similarly an original region of interest/disinterest 2750 can be shifted to produce a shifted region of interest/disinterest 2760. Whether this region has been marked because it is the basis upon which the video entity is identified or because it is a region which needs to be excluded from the video entity identification process, shifting of that region can cause failure of the automated detection system. As will be appreciated by one skilled in the art, a number of other shifting mechanisms can be used to cause slight alterations in the video stream which will not be perceivable by the user but which cause the automated detection system to fail.

Random movement of overlays, logos, bugs, and regions of interest/disinterest can cause significant changes in the fingerprints of the video stream and will cause failure of the fingerprint based detection system. In one embodiment small movements of the previously described graphic elements are made randomly and with sufficient frequency such that the statistical parameters associated with fingerprints made on a frame by frame basis are substantially alter. For example, an overlay, logo, or bug may be made to crawl across the screen for 2-3 seconds, causing the CCVs for those screens (frames) or sub-frames associated with those frames to have values that are substantially different than the values that those frames would have with out the overlay, logo, or bug, or which they would have if the overlay, logo, or bug was stationary. When the CCV is altered to the point at which the dissimilarity with stored fingerprints (CCVs) has increased above the threshold, the fingerprint detection system will assume that the incoming video stream does not contain fingerprints corresponding to video segments/entities of interest. Movement of the overlay, logo, bug, or region of interest/disinterest can be randomized such that each crawl has different parameters (e.g. direction, speed, path) so that the path is essentially unpredictable.

Figure 28:
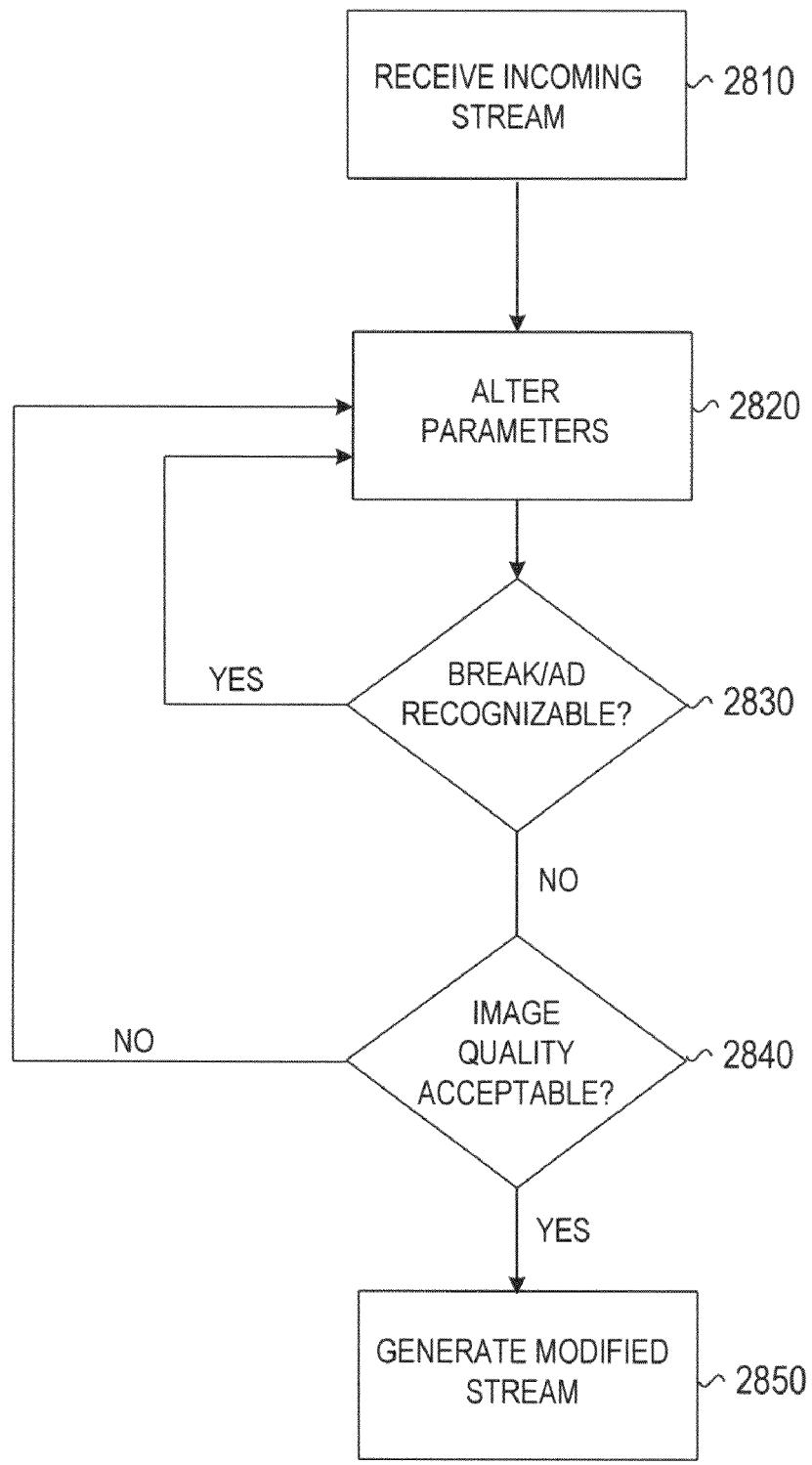
FIG. 28 illustrates a flowchart for the modification of a video stream.

FIG. 28 illustrates a flowchart for the modification of a video stream to defeat recognition systems in which a video stream is received in a received incoming stream step 2810 and is then processed by an alter parameters step 2820. A break/ad recognizable test 2830 is performed and optionally, an image quality acceptable test 2840 may be performed. In the event that a break or ad is recognizable as determined by break/ad recognizable test 2830 the system may cause further alteration of the video stream parameters in the alter parameter step 2820. As an optional step, the image quality may be monitored, and if the image quality is found to be acceptable the modified stream is generated in a generated modified stream step 2850. If the image quality is found to be not acceptable, the system may cause alteration of parameters in alter parameters step 2820 to restore the video to acceptable quality.

The method, system and apparatus described herein thus allows for the alteration of a video stream either by altering features within the video stream or by altering the statistical parameters associate with the video streams such that video segments or other video entities of interest in the original stream can not be detected. By altering the video stream to produce a modified video stream the dissimilarity between a video segment fingerprint derived from the video stream in a stored fingerprint representing the video stream can be increased such that the video segment in the stream cannot be identified. The measure of dissimilarity may be a mean square measure, an absolute measure, or any other geometrical or arithmetic measure of dissimilarity between video stream and the stored fingerprints. Alternatively, the video stream may be modified such that the dissimilarity between the video segment fingerprint and the expected or actual fingerprint representing the video segment is decreased but that the similarity between the video segment fingerprint and a false fingerprint or a fingerprint representing the incorrect video segment is increased causing excessive false positives in the video segment detection system.

As previously discussed, the alteration of the video stream can occur in a compressed or uncompressed video stream and when occurring in a compressed video stream alterations to I frames alone can be made or alterations to B frames or P frames can be made or alterations of all frames can be performed to ensure failure of a video detection system.

The system can be implemented in hardware, in software or in a combination thereof and can be realized as a receiver which receives a video stream and a processor which detects one or more parameters of a video stream which can be used for detection and which then alters those parameters to prevent detection of the video segment. The system can be realized in one device or may be distributed amongst a number of devices.

As an example of the industrial applicability of the method, system and apparatus described herein, a broadcaster may desire to alter the video stream to prevent automatic detection of advertisements. This alteration can occur at production/editing time, on a produced video stream or may occur at the actual time of encoding. Broadcasters may make measures of features or statistical parameters useful for recognition of video entities and may alter those parameters or may simply make random alterations to the initial video stream. For example a broadcaster may broadcast sports programming with sets of advertisements contained therein. Although these advertisements may be recognizable by various systems and libraries may have been created containing those advertisements, the broadcaster can alter the stream at the time of transmission of the sports programming such that the advertisements are not recognized and substitution of those advertisements cannot occur.

Another use of the present method, system and apparatus is the alteration of the video stream to prevent automated bookmarking of materials. This may be useful in applications where bookmarking can be considered to be detrimental to the content or in which a content provider or service provider desires to provide bookmarking as an additional service. By altering the video stream to defeat the automatic detection of scene changes and other video entities the user is required to rely on the content provider or service provider for the bookmarking functionality.

Another example of the industrial use of the present method, system and apparatus is the alteration of a video segment which is embedded in a longer video segment such that recognition of the video segment based on feature detection is no longer possible. As an example, a content provider may, prior to transmission, randomly scatter intros/outros into the broadcast without showing any advertisement after them or may alter the programming surrounding the advertisement to cause it to have features similar to those found in an advertisement. In this example the content provider or broadcaster may perform automated editing of the programming either in the vicinity of the advertisements or throughout the programming to add effects which cause the features of the programming to closely match those of the advertisement.

In another industrial application the method, system and apparatus disclosed herein is used to perform automated editing of advertisements in order to alter their features or fingerprints. As an example a content provider or broadcaster may cause the advertisements to be shown in less than full screen mode or will insert frames, delete frames, add random intros/outros, randomly move overlays or perform other modifications to the advertisements themselves such that automated detection is rendered ineffective. A content provider or broadcaster can perform this automated editing in a system which randomly or deterministically alters the advertisements but does not cause changes so significant that a viewer would find the advertisement unpleasant or extremely distorted. In some instances no visible artifacts will be observable due to factors related to visual perception of humans, while in other instances visual artifacts will be present but will be acceptable to the content provider or broadcaster and viewer.

Other examples of modification of the video stream include presentation of advertisements in picture-in-picture mode or with varying backgrounds, overlays such as crawlers, news sequences, bugs or logos, which are moved across the screen in a random or deterministic manner, and the generation of large numbers of backgrounds or portions of advertisements that render a fingerprint based system unmanageable because of the number of fingerprints that are needed to be maintained in the library.

Other uses of the method, system and apparatus can be envisioned in which the video stream is sufficiently modified such that automatic detection of video entities cannot be performed without the specific authorization from the content or service provider.

It is noted that any and/or all of the above embodiments, configurations, and/or variations of the present invention described above can be mixed and matched and used in any combination with one another. Moreover, any description of a component or embodiment herein also includes hardware, software, and configurations which already exist in the prior art and may be necessary to the operation of such component(s) or embodiment(s).

All embodiments of the present invention, can be realized in on a number of hardware and software platforms including microprocessor systems programmed in languages including (but not limited to) C, C++, Perl, HTML, Pascal, and Java, although the scope of the invention is not limited by the choice of a particular hardware platform, programming language or tool.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

The many features and advantages of the invention are apparent from the detailed specification. Thus, the appended claims are to cover all such features and advantages of the invention that fall within the true spirit and scope of the invention. Furthermore, since numerous modifications and variations will readily occur to those skilled in the art, it is not desired to limit the invention to the exact construction and operation illustrated and described. Accordingly, appropriate modifications and equivalents may be included within the scope.

What is claimed is:

1. A method of altering an image to prevent the detection of the image, the method comprising:
   receiving the image;
   identifying a plurality of types of modifications to be made to the image, the modifications, when applied, causing a spatial alteration of the image;
   randomly selecting a first type of the types of modifications; and
   altering at least a portion of the image by applying the randomly selected first type of modification to the image, wherein the altering reduces the ability to detect the image.

2. The method of claim 1, wherein the altering at least a portion of the image includes varying a portion of the image with static content.

3. The method of claim 1, wherein the altering at least a portion of the image includes varying a set of pixels to alter a color histogram associated with image.

4. The method of claim 1, wherein the altering at least a portion of the image includes varying a set of pixels to alter a color coherence vector associated with the image.

5. The method of claim 1, wherein the plurality of types of modifications includes at least one of staling, shifting, cropping, rotation, stretching and warping of the image.

6. The method of claim 1, wherein the spatial modification does not perceivably degrade the image quality.

7. The method of claim 1, further comprising:
   analyzing the altered image to determine if the altered image has been sufficiently altered to reduce the ability to detect the image.

8. A method of altering at least one image of a series of images to prevent the detection of the series of images, the method comprising:
   receiving the series of images;
   identifying a plurality of types of modifications to be made to at least one image of the series of images, the modifications, when applied, causing a spatial alteration of the at least one image;
   selecting at least two of the types of modifications;
   randomly selecting at least a first and a second image of the series of images; and
   altering at least a portion of the first image by applying one of the at least two types of modifications and altering at least a portion of the second image by applying a different of the at least two types of modifications, wherein the altering reduces the ability to detect the series of images.

9. The method of claim 8, wherein the altering at least a portion of at least the first image or the second image includes varying a portion that includes static content.

10. The method of claim 8, wherein the altering at least a portion of at least the first image or the second image includes varying a set of pixels to alter a color histogram associated with the image.

11. The method of claim 8, wherein the altering at least a portion of at least the first image or the second image includes varying a set of pixels to alter a color coherence vector associated with the image.

12. The method of claim 8, wherein the series of images are frames of a video.

13. The method of claim 8, wherein the plurality of types of modifications includes at least one of scaling, shifting, cropping, rotation, stretching and warping of the image.

14. The method of claim 8, wherein the spatial modification does not perceivably degrade the image quality.

15. The method of claim 8, further comprising:
   analyzing at least one of the altered images to determine if it has been sufficiently altered to reduce the ability to detect the series of images.

* * * * *